United States Patent
Nagai et al.

(10) Patent No.: US 7,610,626 B2
(45) Date of Patent: Oct. 27, 2009

(54) RECORDING MEDIUM, RECORDING APPARATUS, READING APPARATUS, AND PROGRAM AND METHOD THEREFORE

(75) Inventors: Takahiro Nagai, Osaka (JP); Kaoru Murase, Nara (JP); Hideshi Ishihara, Katano (JP)

(73) Assignee: Panasonic Corporation, Osaka (JP)

( * ) Notice: Subject to any disclaimer, the term of this patent is extended or adjusted under 35 U.S.C. 154(b) by 1131 days.

(21) Appl. No.: 10/395,135

(22) Filed: Mar. 25, 2003

(65) Prior Publication Data
US 2003/0231334 A1 Dec. 18, 2003

(30) Foreign Application Priority Data
Mar. 25, 2002 (JP) ............................. 2002-082618

(51) Int. Cl.
G06F 7/04 (2006.01)
G06F 17/30 (2006.01)
G06F 21/00 (2006.01)

(52) U.S. Cl. ............................. 726/26; 726/27; 726/30; 705/54; 705/57

(58) Field of Classification Search ................... None
See application file for complete search history.

(56) References Cited

U.S. PATENT DOCUMENTS 6,721,437 B1 * 4/2004 Ezaki et al. ................ 382/100
7,181,624 B2 * 2/2007 Asano et al. ............... 713/178
2001/0032088 A1 10/2001 Utsumi et al.

FOREIGN PATENT DOCUMENTS

| EP | 938091 A2 * | 8/1999 |
|---|---|---|
| EP | 0 969 462 | 1/2000 |
| EP | 1 134 964 | 9/2001 |
| EP | 1 154 426 | 11/2001 |
| JP | 11-102572 | 4/1999 |
| JP | 2000-100067 | 4/2000 |
| JP | 2002-262227 | 9/2002 |

* cited by examiner

*Primary Examiner*—Benjamin E Lanier
(74) *Attorney, Agent, or Firm*—Wenderoth, Lind & Ponack, L.L.P.

(57) ABSTRACT

An MPEG2-PS format digital stream is composed of VOBUs and each VOBU except an RDI-Pack at the top is encrypted using a content key Kc. The content key Kc is an encryption key obtained by adding a title key Kt to CCI, and then converting a time varying coefficient using the sum. Accordingly, the resulting content key Kc differs for each VOBU. Since each content key Kc is all different for such a small unit of VOBU, copyright of the digital stream is firmly protected. CCI contained in RDI-Pack represents conditional Copy Freely status which allows the digital stream to be copied on condition that the digital stream is recorded only in encrypted form.

5 Claims, 31 Drawing Sheets

FIG. 6

|  | CGMS | PES SCRAMBLING CONTROL | EPN FLAG |
|---|---|---|---|
| COPY FREELY | 00 | 00 | 0 |
| EPN-ASSERTED COPY FREELY | 11 | 11 | 1 |
| NO MORE COPY | 11 | 11 | 0 |

FIG. 11

DTCP DESCRIPTOR

| | |
|---|---|
| RETENTION MOVE MODE | TEMPORARY STORAGE/MOVE MODE |
| RETENTION STATE | TEMPORARY STORAGE PERIOD |
| EPN | EPN-ASSERTED COPY FREELY |
| CCI | COPY CONTROL INFORMATION |
| IMAGE CONSTRAINT TOKEN | RESOLUTION RESTRICTION INFORMATION |
| APS | ANALOG PROTECTION |

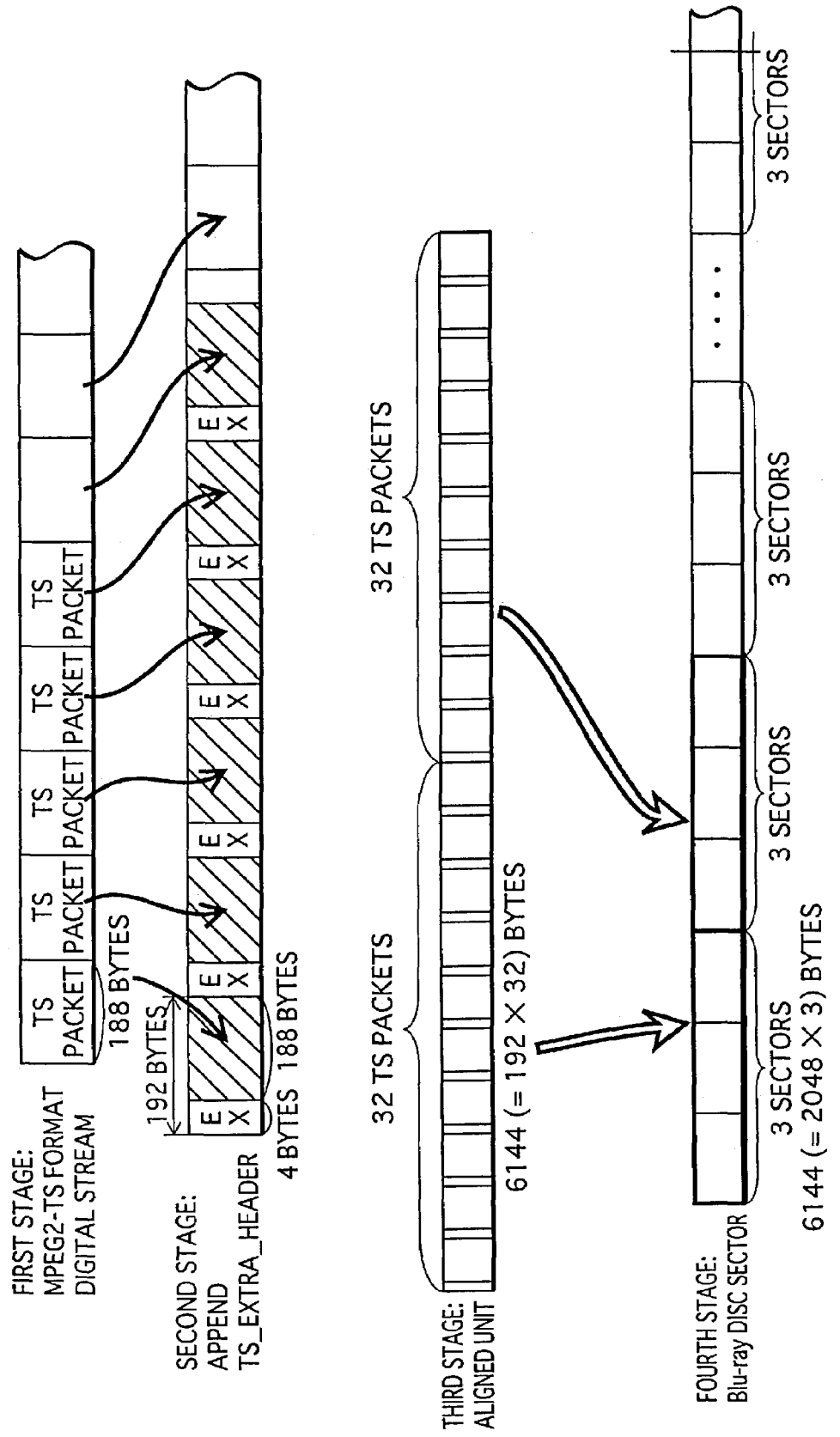

RECORDING MEDIUM, RECORDING APPARATUS, READING APPARATUS, AND PROGRAM AND METHOD THEREFORE

This application is based on an application No. 2002-082618 filed in Japan, the content of which is hereby incorporated by reference.

BACKGROUND OF THE INVENTION (1) Field of the Invention

The present invention relates to a recording medium, such as a DVD, a recording apparatus, a reading apparatus, and a program. More particularly, the present invention relates to an improvement on personal use of copy righted digital contents on a home network.

(2) Description of the Related Art

In research and development on recording mediums and recording apparatuses, one important issue is how to provide home network adaptability to recording mediums and recording apparatuses. A home network is a type of local area network constructed with appliances each having a digital interface that are interconnected to one another via a digital cable such as IEEE1394. With a home network incorporating an STB (Set Top Box), a digital TV, a personal computer, and a recording apparatus, a user can receive digital data with the personal computer or the STB, and transmit the digital data over the home network to the digital TV, which may be located in a separate room within a same household, to play back the digital data. Further, the user can record the digital data on a DVD using the recording apparatus, which may be located in another separate room within the same household. In short, a home network makes it possible to share digital data among networked appliances, which significantly improves the convenience of users.

However, free distribution of digital data over a home network gives a rise to a problem on copyright protection of copyrighted video data and audio data. As long as it is on a home network and for personal use, copying or playback of a copyrighted digital content will not violate the distribution right, the reproduction right, and the communication right. Such use of digital contents on a home network is only for personal use and thus is not subjected to copyright protection. Techniques for recording digital video data onto a DVD for making a personal copy are disclosed, for example, in U.S. Pat. No. 6,272,286 and Japanese Patent No. 3162044.

Problems associated with personal copying include what copyright protection is to be applied to video data recorded on a recording medium, and whether to permit copying of such video data. It is undesirable to apply no copyright protection to personal copying of digital data on a home network. This leads to undesirable possibility that unauthorized copies of the video data made on a home network are uploaded to sites on the Internet and distributed to public without the consent of the copyright holders. However, it is not desirable either to impose limitation on personal copying of video data by imposing copy control information, as disclosed in the above stated patents, such as "Only One Copy" where copying of the video data is permitted only once, and "No More Copy" where no copying of the digital data is permitted. This leads to that users cannot fully enjoy their rights to copy any digital data for personal use, which tends to invite resistance from the users.

Above problems are more notable in connection with TV programs since the right to make a personal copy of a TV program has long been taken for granted. Distribution of digital data that is obtained by encoding a TV program infringes the copyright holder's right. With pirate versions being widely distributed, the TV program put into the market as an authorized software package would not sell well. On the other hand, however, it is unacceptable for users to be prohibited from making a personal copy of the digital data despite that it technically possible to make such a copy in good quality. Conventionally, there is no copy control technique that protects the rights of both copyright holders and users in good balance. With this being the situation, manufacturers of home appliances are pushed into a difficult position.

SUMMARY OF THE INVENTION

An object of the present invention is to provide a recording medium, a recording apparatus, a reading apparatus, a duplication apparatus all for applying copy control to a digital stream, so that uploading of the digital stream to a public network is prohibited, while permitting a personal copy of the digital stream to be made.

The object stated above is achieved by using a recording medium on which a digital stream is recorded. The digital stream is associated segment by segment with copy control information showing whether a corresponding segment has a Conditional Copy Freely status. The Conditional Copy Freely status shows that the segment is permitted to be freely copied on condition that the segment is recorded in a copy destination in encrypted form.

A segment of the digital stream recorded on the recording medium is copied on condition that the segment is recorded in the copy destination in encrypted form. That is say, as long as it is recorded in encrypted form, a segment of the digital stream is permitted to be freely copied. With this arrangement, users can fully enjoy their rights to copy the digital stream for personal use. At the same time, since it is required to encrypt the digital stream, unauthorized apparatuses that are incapable of performing encryption/decryption are prohibited from freely copying the digital stream. Since unauthorized apparatuses are prohibited from making a copy of the digital stream even for personal use, distribution of the digital stream to public is prevented.

Here, the copy control information may include generational management information and an extension flag. The copy control information shows the Conditional Copy Freely status when (1) the generational management information is set to a value representing copy prohibition and (2) the extension flag is set to ON.

When the recording medium is mounted to an apparatus that is not capable of processing "Conditional Copy Freely" status, the apparatus performs a series of copy operations in accordance with the generational management information contained in the copy control information. Here, the generational management information is set to a value representing copy prohibition, so that the digital stream is not copied. Since apparatuses without "Conditional Copy Freely" processing capability are prohibited from making a copy of the digital stream freely, it is prevented that copies of the digital stream are distributed to public.

Here, there may be a question associated with the Conditional Copy Freely setting, which allows the digital stream to be copied as long as it is encrypted. The question is whether there is a possibility that the digital stream having a copy prohibited status is freely copied within a home network when the copy control information is tampered to alter the copy prohibition status to the Conditional Copy Freely status.

To eliminate the above undesirable possibility, each segment recorded on the recording medium may be in encrypted form. The encryption is performed using a predetermined encryption key. Each encryption key takes on a different value depending on whether the copy control information shows the Conditional Copy Freely status.

The digital stream is encrypted segment by segment using an encryption key generated from the copy control information. When the copy control information is tampered to alter the copy prohibited status to the Conditional Copy Freely status, an encryption key generated in an attempt to decrypt a corresponding segment will greatly differ from an encryption key used to encrypt the segment. Consequently, the segment of the digital stream cannot be decrypted using such an encryption key resulting from the tampering. With this arrangement, it is ensured that the Conditional Copy Freely setting introduced herein does not weaken the copyright protection.

On the other hand, however, when the recording medium is mounted to an apparatus that does not generate an encryption key from the copy control information, the apparatus cannot detect tampering of the copy control information. To deal with the above setback, each segment recorded on the recording medium may be in encrypted form. The encryption is performed using a predetermined encryption key. Each segment recorded on the recording medium may be associated with a check code. The check code is obtained by converting the copy control information using the encryption key, and takes on a different value depending on whether the copy control information shows the Conditional Copy Freely status.

In order to maintain compatibility with an existing model, there is a case where an encryption key is generated from data that is independent of the copy control information. In this case, tampering of the copy control information is detected by checking the codes. With this arrangement, the copy control information is prevented from being tampered while maintaining compatibility with an excising encryption system.

It should be noted that there is copy control that may be confused with the Conditional Copy Freely status. Examples of such copy control include "move", and "migrate", "check-out". The differences are as follows.

A "move" is a copy operation that requires deletion of a content from the copy source after copying. This operation is used when moving a content from one recording medium to another recording medium. The "Conditional Copy Freely" status clearly differs from the "move" operation in the sense that deletion of a content form the copy source is not required.

A "migrate" is a copy operation that requires generation of usage condition information for the content in the copy destination. The "Conditional Copy Freely" status clearly differs from the "migrate" operation in the sense that neither deletion of the contents from the copy source nor generation of usage condition information is required.

A "check-out" is a copy operation to be performed only for a permitted number of times. Copying is performed after decrementing the permitted number of times by 1. The "check-out" operation is different from a generally referred copy operation with a limit to the permitted number of times in that the permitted number of times can be incremented. The permitted number of times is incremented after disabling playback of the content in the copy source (this operation is referred to as "check-in"). The "Conditional Copy Freely" status clearly differs from the "check-out" operation in the sense that there is no limit to the number of times of copying. In view of the above, it is said that the "Conditional Copy Freely" status indicates that copying is permitted as many times as desired without requiring any limit to be imposed on the permitted number times or a content to be deleted from the copy source. The only condition required is that a content is recorded in encrypted form.

BRIEF DESCRIPTION OF THE DRAWINGS

These and the other objects, advantages and features of the invention will become apparent from the following description thereof taken in conjunction with the accompanying drawings which illustrate exemplary embodiments of the invention.

In the drawings:

FIG. 6 is a view showing values that each of CGMS, PSC, and EPN flag possibly takes along with the meaning indicated thereby;

FIG. 11 is a view showing one example of a DTCP_Descriptor;

FIG. 21 is a view showing the process through which writing to a Blu-ray disc is performed;

SUMMARY OF THE INVENTION

Figure 1:
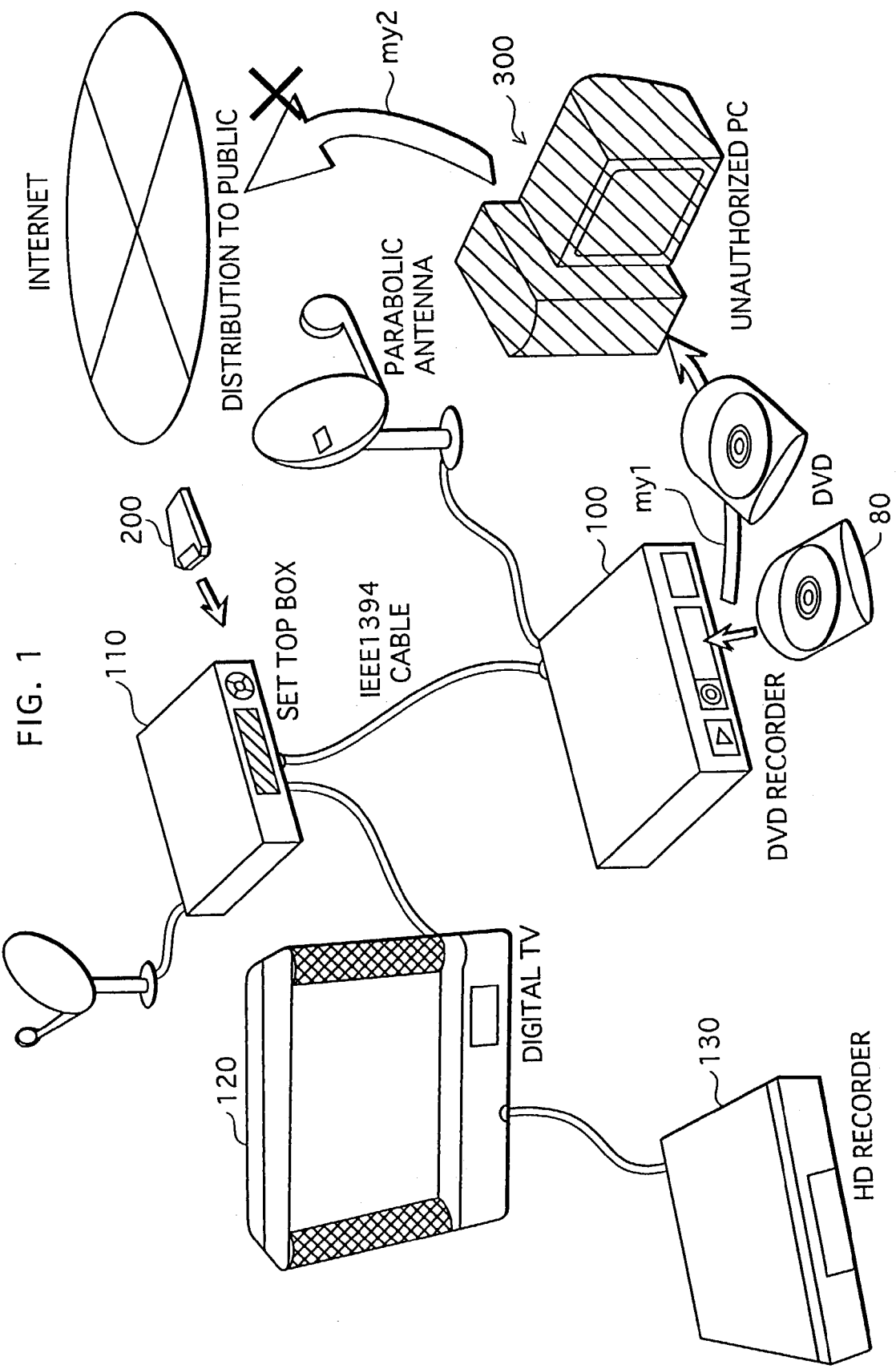
FIG. 1 is a view showing a home network, which is a use environment of a recoding medium according to the present invention.

Hereinafter, description is given to preferred embodiments of implementation of a recording medium according to the present invention. First, description is given to usage of a recording medium according to the present invention. The recording medium according to the present invention is a DVD on which an MPEG2-PS (Program Stream) format digital stream is recorded thereon, and is for use by a user if a home network. FIG. 1 is a view showing the home network, which is a use environment of the recoding medium according to the present invention.

The home network is constructed of interconnected appliances each equipped with an IEEE 1394 digital interface, and such appliances include, for example, a DVD recorder 100 acting as a recording apparatus, an STB 110, a digital TV 120, and an HD recorder 130. Each networked appliance is controlled by a user with a single remote controller 200. In addition, each networked appliance is capable of transmitting to, and receiving from another networked appliance via IEEE1394, an MPEG2-TS (Transport Stream) format digital stream that has been received from a broadcasting station. The digital stream is permitted to be freely copied within the home network, which is a closed network. A DVD is mounted on the DVD recorder 100 where data is written on the DVD. A recording medium according to the present invention is manufactured by writing data with the DVD recorder 100 onto a DVD. Here, it is possible that the DVD on which an MPEG2-PS format digital stream is recorded is taken out of the home network (an arrow my1). Yet, the DVD is disabled to be read by an unauthorized personal computer so that the digital stream is protected from being uploaded to a site on the Internet (an arrow my2). The recording medium (DVD) according to the present invention realizes that a digital stream recorded thereon is freely copied within the home network while preventing a drain of the digital stream out of the home network. This concludes the description of the embodiment relating to usage of the recording medium according to the present invention.

Next, description is given to manufacture of a recording medium according to the present invention. A recording medium of the present invention is manufactured by writing, on a DVD, data shown in FIG. 2.

Figure 2:
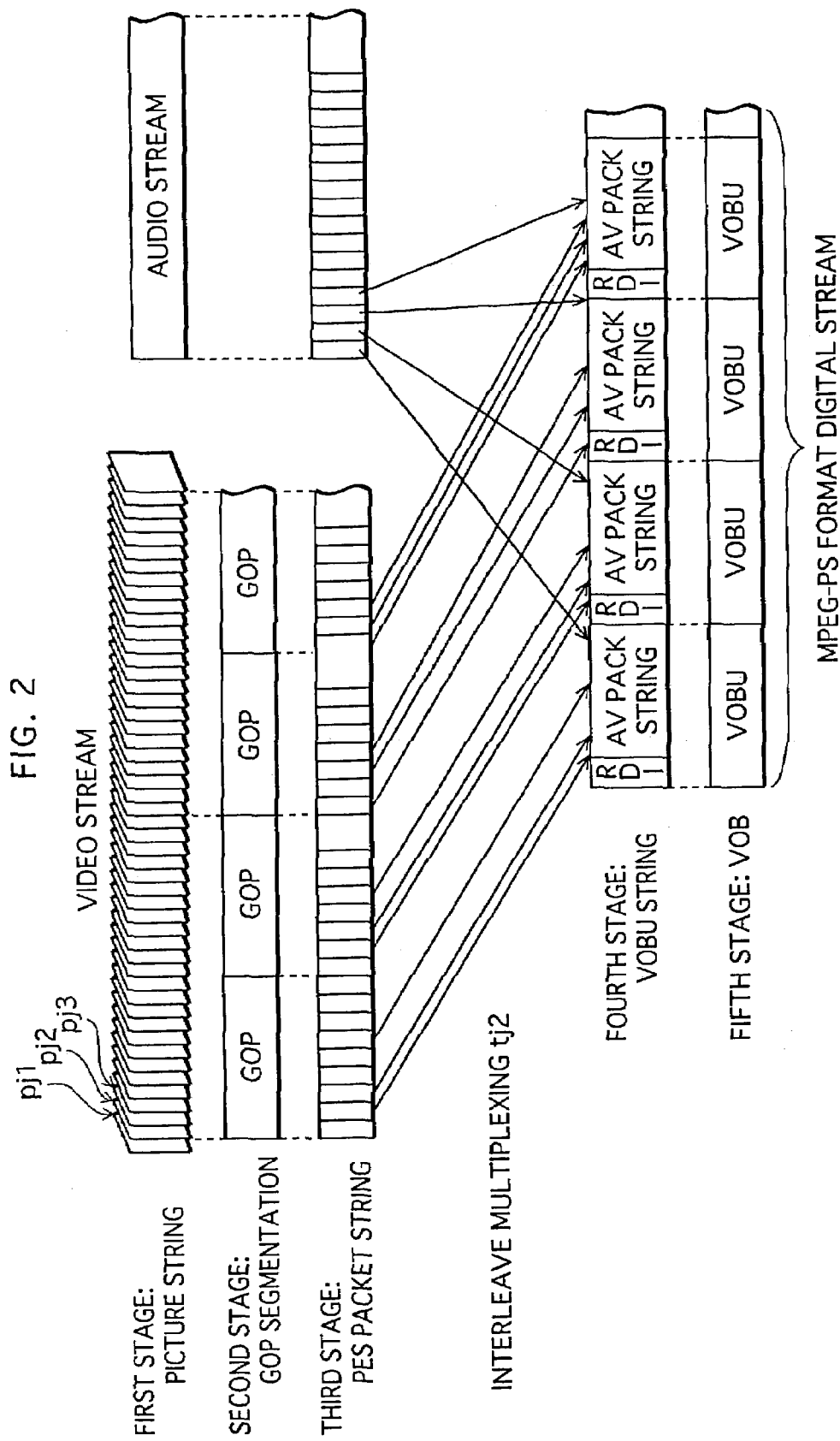
FIG. 2 is a view showing the process through which VOBUs are recorded.

FIG. 2 is a view showing the construction of a digital stream recorded on the DVD in different stages in more detail. In the figure, the digital stream recorded on the DVD is shown in the fifth and final stage. The digital stream is an MPEG2-PS format digital stream, and referred to as "VOB (Video Object)" according to the DVD-Video Recording Standard.

As shown in the figure, the VOB is obtained by multiplexing a video stream and an audio stream, which are shown in the first stage. The video stream at the first stage is a sequence of pictures pj1, pj2, pj3 . . . , and each picture is displayed for a fixed display period (also referred to as a video frame). According to the NTSC system display, one video frame is about 33 msec (1/29.97 sec to be more precise), while it is about 40 msec according to the PAL system display. Each picture is compression coded based on inter-frame correlation, and thus there are different types of pictures constituting a video stream. One is a Bidirectionally Predictive (B) picture that is compression coded using the correlation with both past and future pictures in display order, a Predictive (P) picture that is compression coded using the correlation with the past pictures, and an Intra (I) picture that is compressed coded using the spatial frequency characteristic of itself and without using the inter-frame correlation.

A smallest decryptable unit in a video stream is GOP (Group Of Picture). Each GOP is a sequence of pictures including at least one I picture and corresponding to playback of about 0.4-1.0 sec. In FIG. 2, the first-stage video stream is divided into a plurality of GOPs in the second stage. Since the picture data is compressed by a variable length coding, the length of each GOP is different from one another. Upon recordation onto a DVD, each GOP, regardless of the size, is further divided into a plurality of pieces. The resulting pieces are assembled into PES packets shown in the third stage. In addition, the audio stream shown in the first stage at the right is also divided into a plurality of pieces, and the resulting pieces are assembled into PES packets also shown in the third stage. As shown in a third stage in FIG. 2, a PES (Packetized Elementary Stream) packet includes a piece of the video steam and a piece of the audio stream, and having, in the header, "DTS" (Decode Time Stamp) showing when the pieces of the video and audio streams are to be decoded, and "PTS" (Presentation Time Stamp) showing when the decoded pieces are to be played back.

The string of PES packets each containing a piece of GOP is divided into a plurality of groups, and each group of PES packets is interleaved-multiplexed (tj2) with a PES packet containing a piece of the audio stream, so that an AV pack string is constituted within each VOBU. An RDI-Pack (labeled as "RDI" in the figure) is appended to the top of each VOBU.

Figure 3:
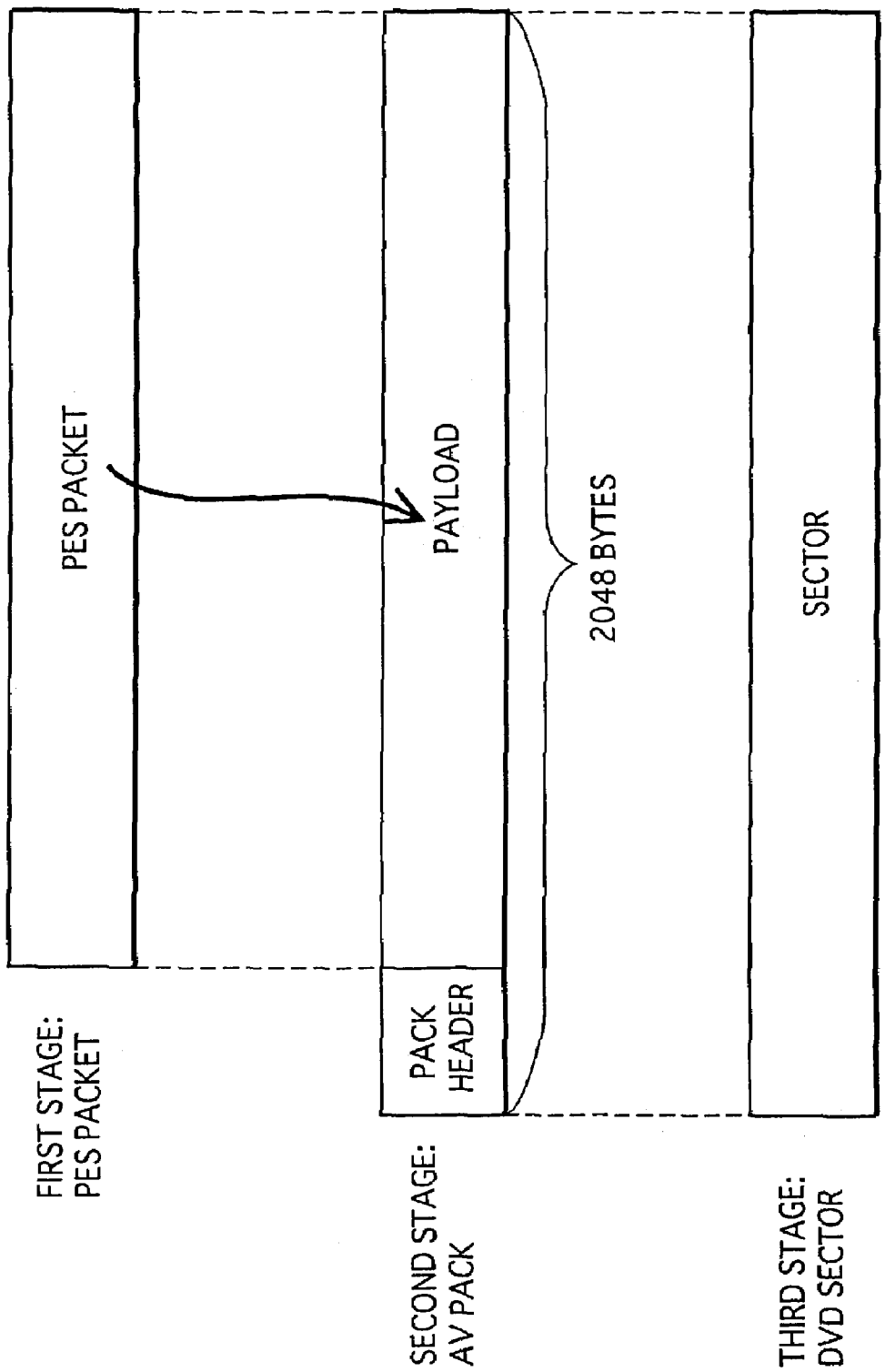
FIG. 3 is a view showing the relation between a PES packet and an AV pack.

FIG. 3 is a view showing the relation between a PES packet and an AV pack. As shown in the second stage in the figure, the AV pack is 2048 bytes in size, and composed of a pack header and a payload. The PES packet is contained in the payload. The pack header contains SCR (System Clock Reference) showing when the AV pack is to be loaded to a buffer of an appliance that is processing the digital stream. The size of the AV pack, which is 2048 byte, is equal to the size of one sector of a DVD, so that AV packs are recoded one by one into each sector of a DVD.

Figure 4:
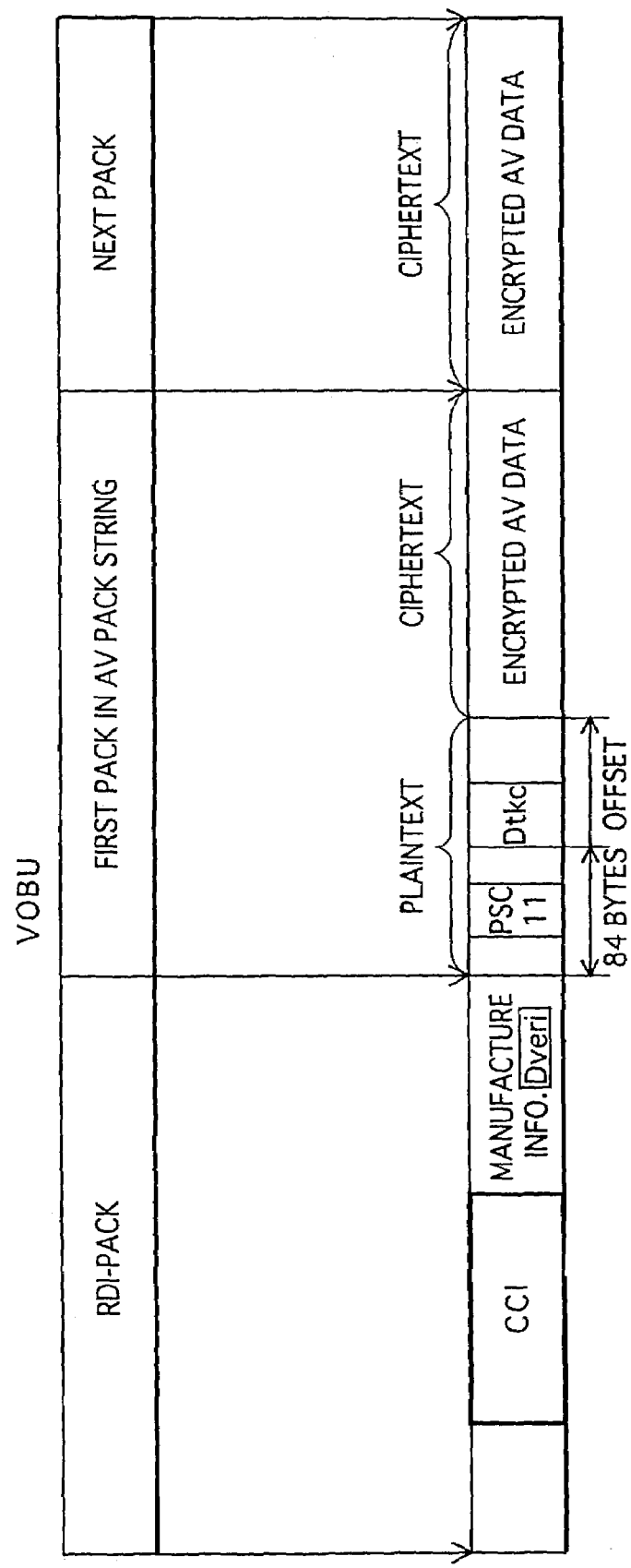
FIG. 4 is a view showing the internal construction of a VOBU.

FIG. 4 is a view showing packs that constitute a VOBU. The first stage in the figure shows the overall construction of the VOBU. As shown in the first stage, the very first pack of the VOBU is an RDI-Pack (Realtime Data Information-Pack), followed by a string of AV packs.

The second stage in FIG. 4 shows the internal construction of the RDI-Pack and the AV pack string that follows. The RDI-Pack contains "CCI (Copy Control Information)", "Manufacture Information", and the first AV pack contains "PSC (PES Scrambling Control)" and "time varying coefficient Dtkc", followed by "encrypted AV data" that is also contained in the subsequent AV packs.

The "CCI" is information defining whether the VOBU is permitted to be copied.

The "Manufacture Information" is information on the appliance with which the VOBU is recorded, and includes a code Dveri.

Up to this point, description is given to the internal construction of the RDI-Pack. Next, description is given to the internal construction of the AV pack string.

The "AV pack string" is composed of a plurality of video packs and audio packs, and thus includes GOPs and audio data. In terms of encryption, the AV pack string includes plaintext data at the top and ciphertext data that follows.

The plaintext data contains "PES Scrambling Control (PSC)" and a time varying coefficient Dktc. The time varying coefficient Dktc is located at a position starting from the $84^{th}$ byte from the top, and the ciphertext data is at an offset location from the time varying coefficient Dtkc.

The "PES Scrambling Control (PSC)" is a flag indicating, when set to "11", that the audio data contained in the VOBU is to be encrypted, and indicating, when set to "00", that the audio data is not to be encrypted. This concludes the rough description of the VOBU construction according to the present embodiment.

The "time varying coefficient Dtkc" includes a time varying factor. To be more specific, the substance of the time varying coefficient Dtkc varies depending on where a portion of the digital stream corresponding to the time varying coefficient is located in a playback time axis of the digital stream. In the present embodiment, taken as the time varying coefficient Dtkc is 8-byte data located at the $84^{th}$ byte from the top of the AV pack string. Typically, located at the $84^{th}$ byte of an AV pack string from the top is part of picture data. The part of the picture data totally differs from other parts depending on where a corresponding VOBU is located in a playback time axis of VOB, and thus said to be a time varying factor.

The "encrypted AV data" is at a position with a predetermined offset from the time varying coefficient Dtkc. Since the top portion of the AV pack string is in plaintext, it appears at first that the GOPs contained in the AV pack string will be successfully played back. Yet, the size of the plaintext portion is about 128 bytes, which constitutes only a small portion of a GOP. Although the top portion is in plaintext, the entire VOBU are not decoded properly. Consequently, the VOBUs containing encrypted data are not properly played back without decrypting the encrypted data.

Figure 5:
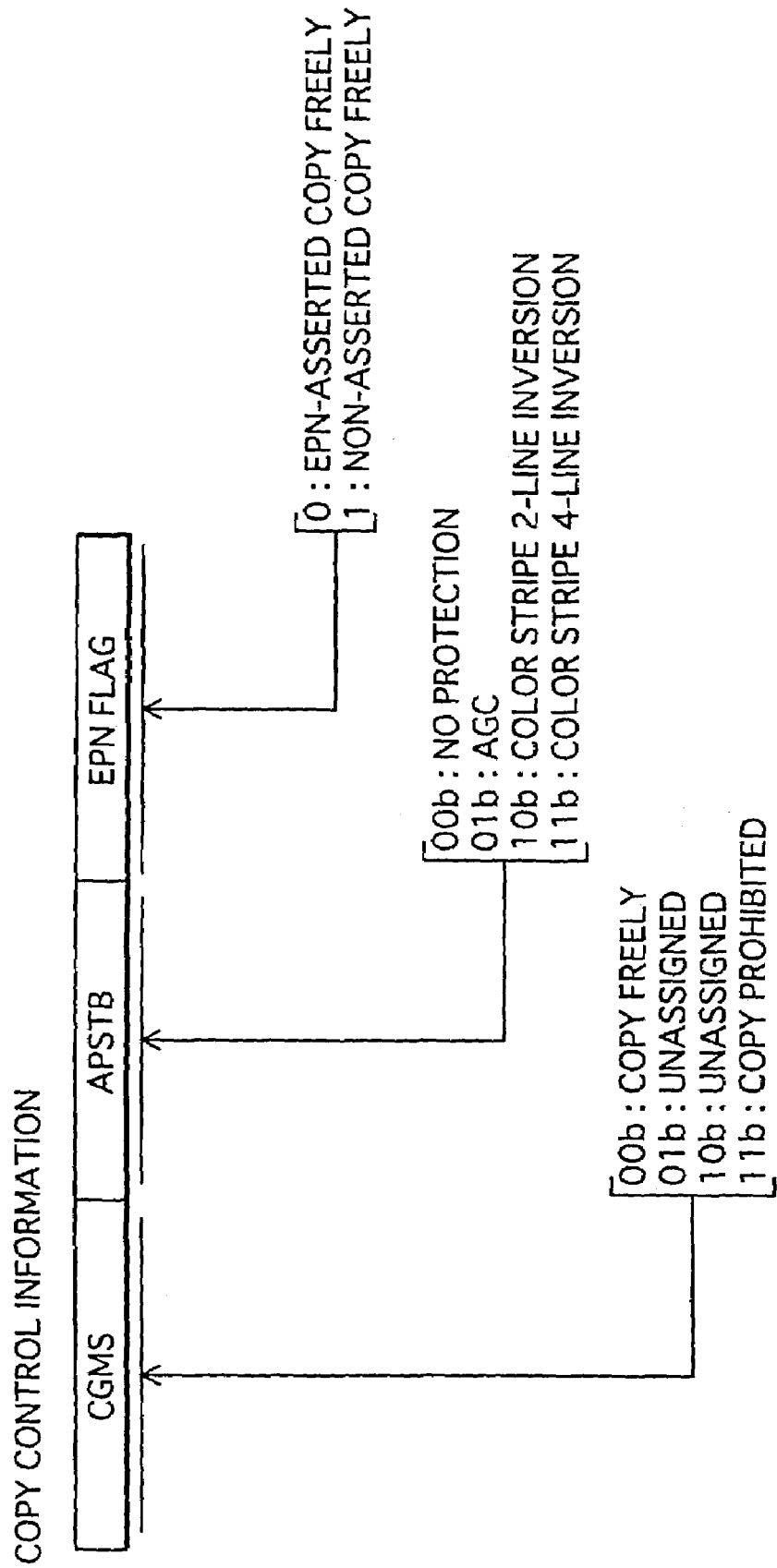
FIG. 5 is a view showing the construction of CCI according to a first embodiment of the present invention.

Next, description is given in more detail to the information indicating whether copying is permitted or prohibited. FIG. 5 is a view showing the construction of CCI according to the first embodiment of the present invention. In the first embodiment, the CCI is composed of a "CGMS (Copy Generation Managing System", "APSTB (Analogue Protection System Trigger Bits", and an "EPN flag". According to the existing DVD-Video Recording standard, CCI is composed of CGMS and APSTB. The CCI consistent with the first embodiment is novel in that an EPN flag is additionally contained.

The "CGMS" indicates, when set to "00", that the status of a corresponding VOBU is Copy Freely, and indicates, when set to "11", that the status of the VOBU is "No More Copy".

The "APSTB" is a two-bit value indicating whether to apply protection to the VOBU upon output of an analog version of the VOBU. When the APSTB is set to "01", the analog output is to be protected by disturbing an AGC circuit of a VCR attempting to play back the VOBU. When the APSTB is set to "10", the analog output is to be protected by disturbing the AGC circuit and 2-line inversion of color stripes. When the APSTB is set to "11", the analog output is to be protected by disturbing the AGC circuit and 4-line inversion of color stripes. When the APSTB is set to "00", the analog output is not protected.

The "EPN (Encrypted Plus Non-Asserted) flag" is used in combination with CGMS. When the CGMS is set to "11", the EPN flag set to ON ("1") indicates that the status of a corresponding VOBU is EPN-Asserted Copy Freely. The EPN-Asserted Copy Freely (also referred to as "EPN Copy Freely") setting means that the VOBU is permitted to be freely copied on certain condition. The condition required is to encrypt the digital stream upon writing to a copy destination.

The present embodiment introduces the setting of the CCI indicating the EPN-Asserted Copy Freely status in order to meet the following requirements resulted from wider use of a home network. Appliances capable of constructing a home network via IEEE1394 are manufactured by legitimate manufacturers, and thus it is assumed that those appliances somehow make it impossible to make unlimited number of copies of a digital stream for the purpose of distribution to third parties. However, considering the case where a digital stream is copied to a removable medium such as a DVD rather than a built-in HD, there is a loop hole. That is, a DVD on which the digital stream is recorded may be carried out of the home network and mounted on an unauthorized personal computer (the arrows my1 and my2 in FIG. 1). In that case, there is an undesirable possibility that the digital stream is distributed to unlimited number of third parties, which significantly damages the right of copy holder. In view of the above problem, the present embodiment has introduced the EPN-Asserted Copy Freely status, which is a novel copy control setting. The EPN-Asserted Copy Freely status indicates that an MPEG2-TS format digital stream is transmitted to another networked appliance on the condition that the digital stream is encrypted. As long as the required condition is met, a third-generation copy, a fourth-generation copy of the digital stream is permitted to be made. Indeed, personal copies of the digital stream are permitted to be made on the home network over generations as long as the required condition is met. Consequently, the user is provided with greater convenience. The EPN-Asserted Copy Freely status is said to be a Copy Freely status with encryption requirement in a sense that a personal copy is made on condition that the digital stream is kept encrypted.

As stated above, the EPN-Asserted Copy Freely setting permits the digital stream to be copied freely as long as the digital stream is kept encrypted. Yet, it is not required to employ any specific cipher system such as an encryption algorithm or data structure. Thus, a copy source and a copy destination may employ a different cipher system from each other. For example, there may be a case where a digital stream is to be copied to a recording medium other than a DVD, and the destination recording medium employs a specific cipher system unique to that destination recording medium. In that case, too, the encryption requirement is met as long as the data stream is encrypted with that specific cipher system.

Further, as long as encryption is preformed, a copy source and a copy destination may employ a different compression coding from each other. For example, when an MPEG2-PS format digital stream is recorded on a DVD acting as a copy source recording medium, the digital stream may be copied to a copy destination after converted to an MPEG2-TS compliant format as long as the digital stream in the copy destination is encrypted. Similarly, it is permitted to copy a digital stream after converting to an MPEG1 compliant or MPEG4 compliant format. However, since encryption of a digital stream is an indispensable and minimum requirement, the digital stream is not permitted to be recorded on a recording medium having no provision for copyright protection. For example, micro drive and CompactFlash are recording mediums having no provision for copyright protection.

Conversely, examples of recording mediums having provision for copyright protection and compulsory encryption include, additionally to DVDs, SD memory cards and Blu-ray Discs. There is an exception where EPN-Asserted Copy freely data is copied without being encrypted. When the copy destination is a built-in recording medium (such as built-in HD) rather than a removable recording medium (such as DVD), encryption is not required because such a built-in recording medium is not readily dismounted and taken away.

Up to this point, description has been given to a technical importance of the EPN-Asserted Copy Freely status, which is indicated by an EPN flag. Now, with reference to FIG. 6, description is given to combinations of a CGMS and an EPN flag. FIG. 6 is a view showing values that each of the CGMS, PSC, and EPN flag possibly takes along with the meaning indicated thereby. With the EPN flag being set to "00" or OFF, the CGMS and the PSC together define whether to permit copying. When both the CGM and PSC are set to "00", the indicated status is Copy Freely without any condition. When both the CGMS the PSC are set to "11", the indicated status is "No More Copy".

On the other hand, with the EPN flag being set to "1", the conditional Copy Freely status is indicated when both the CGMS and the PSC are set to "11". For the CCI to indicate conditional Copy Freely, both the CGMS and PSC are set to "11 (No More Copy)". This is to deal with an appliance that complies with an existing standard and thus is not capable of processing an EPN flag (hereinafter, such an appliance is referred to as non EPN-ready appliance). With the above setting, when a DVD having the VOBUs is mounted a non EPN-ready appliance, it is avoided that the appliance freely copies VOBUs consistent with the present embodiment. To be more specific, being incapable of interpreting the EPN flag, a current standard appliance performs copy control in accordance with CGMS and PES Scramble Control. As described above, the CGMS in this case is set to indicate "No More Copy", so that VOBUs are not copied at all. That is to say, a non EPN-ready appliance is totally prohibited from copying VOBUs, and subjected to stricter copy control than the originally set status. With this arrangement, unauthorized copying of conditional Copy Freely data is prohibited. This copy control is also applied when the CCI is tampered to delete the EPN flag.

Figure 7:
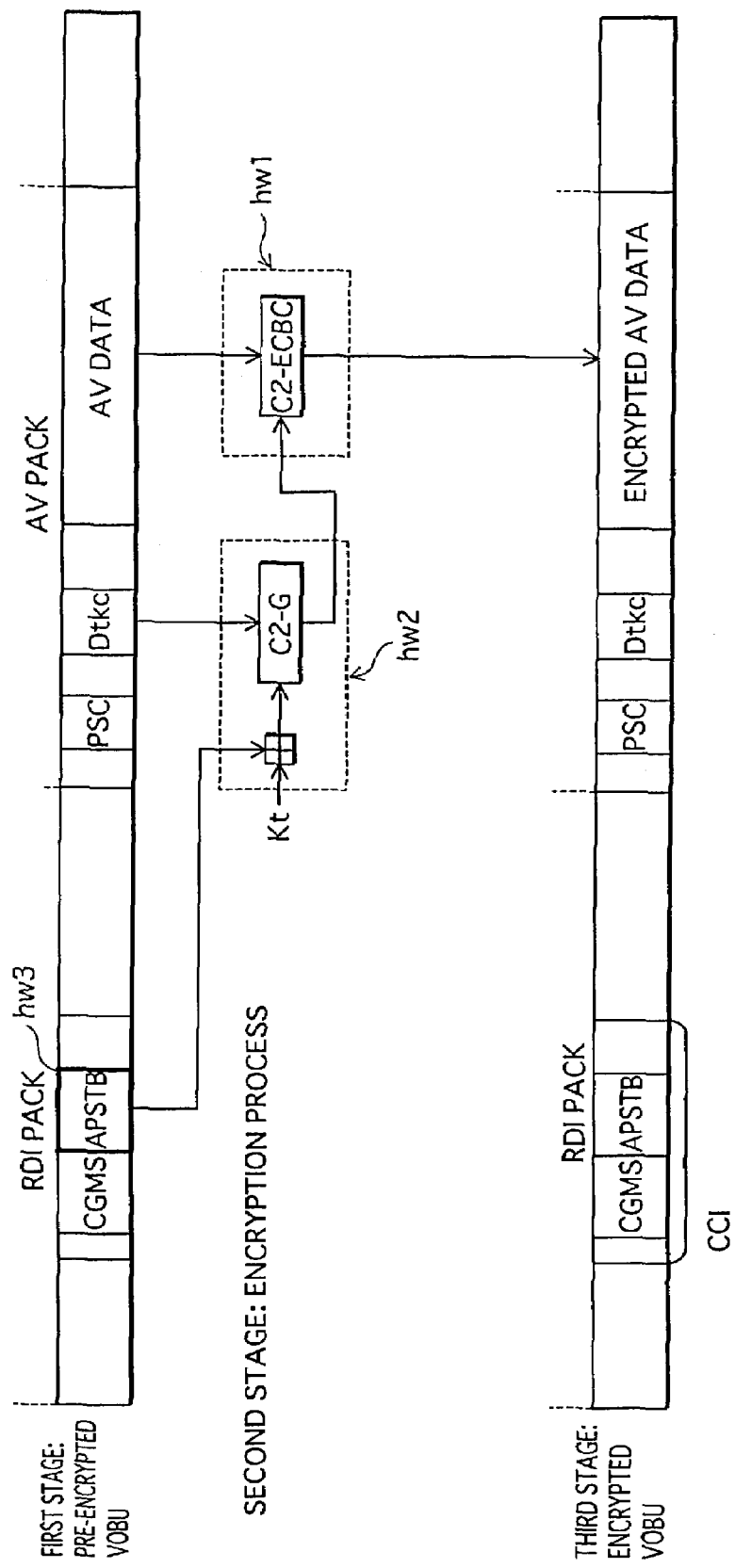
FIG. 7 is a view showing the encryption process through which AV data is generated.

Now, description is given to the encryption process of AV data. FIG. 7 is a view showing the process through which AV data is encrypted. AV data is encrypted using CPRM (Copy Protection for Recordable Media) system that is compatible with an existing DVD-Video Recording standard. The first stage shown in FIG. 7 represents a pre-encrypted VOBU. At this stage, the AV data is not yet encrypted. The third stage represents the encrypted VOBU. A dotted box hw1 between the first and third stages shows the encryption process of the AV data. As shown in the dotted box hw1, encrypted AV data is obtained by encrypting a plurality of pre-encoded video and audio packs using a content key Kc in the C2-ECBC mode.

The encryption in the C2_ECBC mode is to divide AV data contained in the VOBU into pieces each having 64 bits or less, and then to separately encrypt each piece. The first piece located at the top is encrypted using the content key Kc, and a second piece is encrypted using the encryption result of the first piece, and a third piece is encrypted using the encryption result of the second piece. As such, C2_ECBC mode encryption is to sequentially encrypt, with any encryption algorithm, each piece using an encryption result of an immediately prior piece. Note, in addition, decryption by reversely performing the same process steps is referred to as C2_DCBC mode. Further, "C2" as in C2_ECBC mode denotes a cipher system in CPRM.

In the figure, a dotted box hw2 shows a generation process of the content key Kc. To obtain the content key Kc, an add operation is performed using APSTB in the RDI-Pack and a title key Kt that is unique to the recording medium, and then the time varying coefficient Dtkc is C2_G converted using the adding result (sum). A heavy line box hw3 in the figure indicates with emphasis that what is referenced in the CCI to generate the content key Kc is APSTB only.

In the generation process of the content key Kc, the C2-G conversion is a one-way function that applies non-reversible conversion to the sum. Unlike a reversible conversion, which is typically used in encryption, the C2-G conversion is non-reversible so that it is impossible to trace an input value back from its output value. In addition, since the content key Kc is generated using, as a parameter, the time varying coefficient Dtkc contained within the currently processed VOBU. Thus, the content key Kc for that VOBU is obtained even if VOBUs adjacent thereto are deleted. Further, the time varying coefficient Dtkc includes a time varying factor, and thus the resulting content key Kc is all different for each VOBU.

One problem in this encryption process is that the content key Kc is generated only from APSTB rather than the entire CCI.

This is undesirable for the following reason. In a conventional copy control technique, there are only two statuses, which are the encrypted and copy prohibited status or the non-encrypted and Copy Freely status. In other words, "being encrypted=copying prohibited". Thus, as long as it is encrypted, copyright protection for the content is sufficient, and the only risk to be eliminated is tampering of the APSTB. To be more specific, although copying is prohibited, it is still permitted to play back the content. The playback of the content may be recorded with a VCR in the form of analog signals. When the APSTB is set to protect such analog signals, a content key Kc is generated from the APSTB and then the content is encrypted with the thus generated content key Kc. With this arrangement, when the APSTB is tampered, the analog signals are not decrypted and thus dubbing or recording of the analog video signals is prevented.

However, since the present embodiment introduces the new copy control status, which is "Copy Freely status with encryption requirement", encryption of the content using the APSTB is no longer sufficient. Suppose CGMS set to prohibit copying is tampered to indicate the conditional Copy Freely status, it is possible that the content is encrypted and thus freely copied as long as the APSTB remains unaltered. This undesirable possibility also occurs in the case where the CCI containing CGMS indicating copy prohibition is replaced with the RDI-Pack containing CCI that indicates the conditional Copy Freely status.

Figure 8:
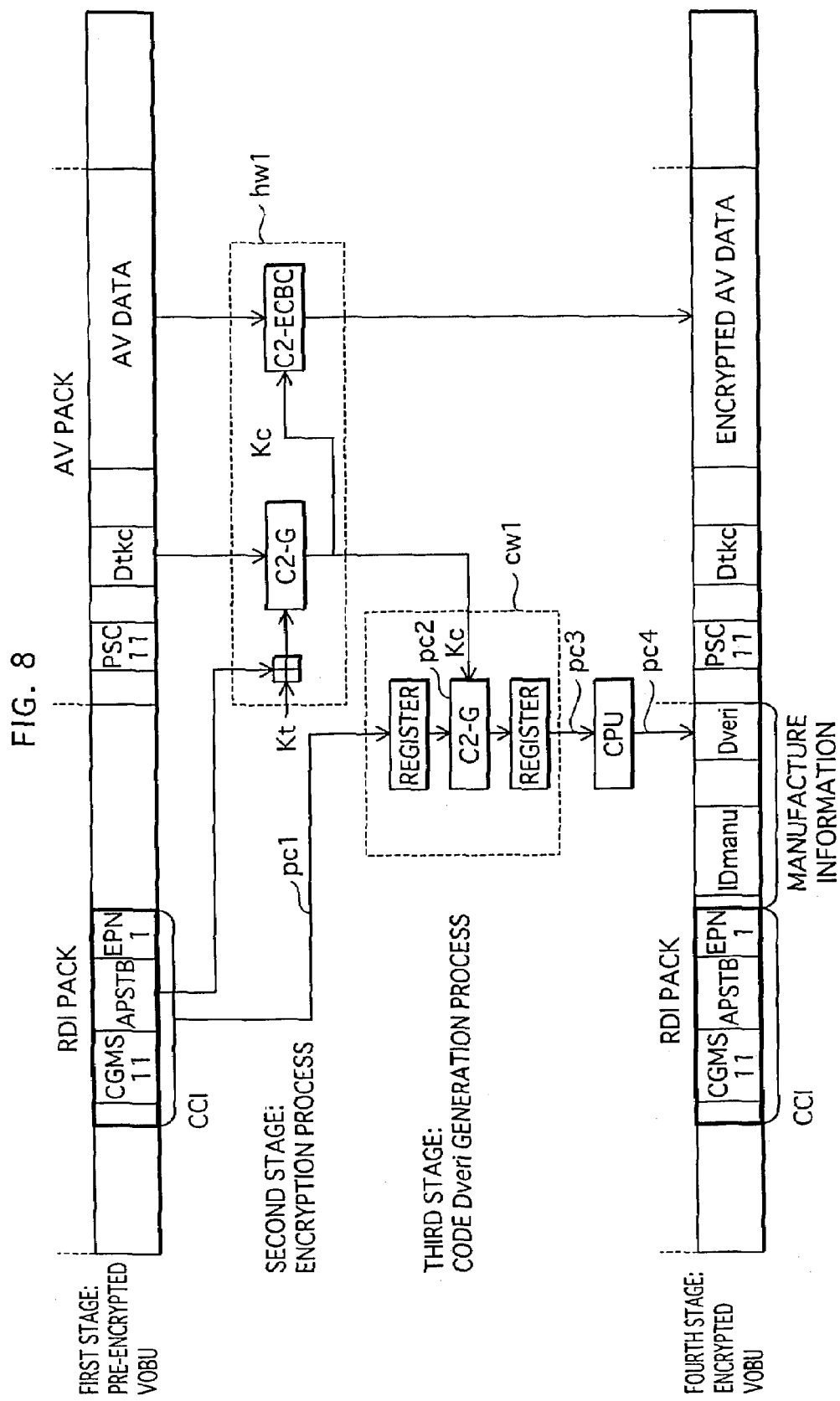
FIG. 8 is a view showing, in a manner similar to FIG. 7, the generation process of a code Dveri.

A code Dveri is provided to eliminate the above undesirable possibility. As shown in FIG. 4, the code Dveri is contained in the Manufacture Information in the RDI-pack. The generation process of a code Dveri is shown in FIG. 8. FIG. 8 shows the generation process of a code Dveri in a manner similar to FIG. 7. The first stage in FIG. 8 represents a pre-encoded VOBU, while the fourth stage represents the encoded VOBU. A dotted box hw1 in the second stage shows the encryption process of the AV data.

The generation process of a Dveri is shown in the third stage, which is between the encryption process of AV data and the encoded VOBU. As shown in the third stage, the code Dveri is obtained by C2-G converting the CCI using the content key Kc.

A dotted box cw1 in FIG. 8 shows a process performed to obtain the code Dveri. As shown in the box, the process includes four process steps. The first step pc1 is to wait for the entire CCI to be stored in a register and the content key Kc to be generated. Here, the CCI contains the CGMS set to "11" and the EPN flag set to "1". The second step pc2 is to C2-G convert the entire CCI in the register using the generated content key Kc. The third step pc3 is to overwrite the register with the C2-G converted CCI. The final step pc4 is for the CPU to write the code Dveri into the Manufacture Information contained in the RDI-Pack.

Since the code Dveri is generated through the above process steps, the following is assured.

That is, since the code Dveri is generated from both the CCI and the content key Kc that is used to encrypt the AV data, it is detected if any tampering has been made to the CCI and/or the RDI-Pack. Such tampering is detected by newly generating a Dveri through the process steps shown in the figure, and then comparing the thus generated code Dveri to the code Dveri stored in the RDI-Pack to see if they match. If they do not match, it is judged that the CCI has been tampered after the VOBU is generated. In the case where a user requests an EPN-ready appliance to copy a VOBU that has been tampered, the EPN-ready appliance generates a content key Kc through the process steps shown in FIG. 8, and C2-G converts the CCI using the thus generated content key Kc. The EPN-ready appliance then compares the data resulting from the conversion to the code Dveri contained in the RDI-Pack. Since the CGMS and the EPN flag are tampered, the resulting data from the C2-G conversion greatly differs from the Dveri contained in the RDI-Pack.

Judging that the two do not match, the EPN-ready appliance terminates the currently processing decryption. With this arrangement, an EPN-ready appliance is provided with protection against RDI-Pack replacement or tampering of CCI while assuring compatibility with appliances that are compliant only with the existing DVD-Video Recording Standard.

The reason why the code Dveri is provided within the RDI-Pack is to do with offset (see FIG. 4) of the AV data from the time varying coefficient Dtkc.

Figure 9:
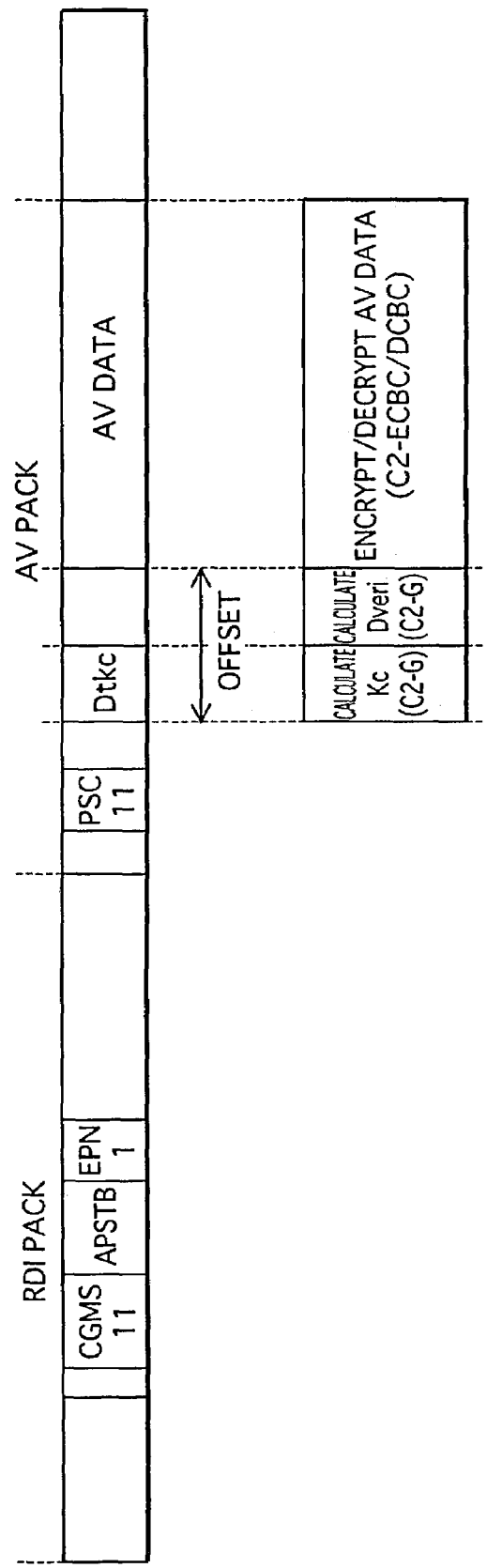
FIG. 9 is a view showing how the offset of the AV data from the time varying coefficient Dtkc is determined.

FIG. 9 is a view showing how the offset of the AV data from the time varying coefficient Dtkc is determined. The offset is determined so as to correspond to the sum of time (C2_G) taken to obtain the content key Kc and time (C2_G) taken to obtain the code Dveri. The three processes, namely the generation of the content key Kc, the calculation of the code Dveri, the encryption/decryption of the AV data, are set to be performed at a different time, so that these processes may be time-shared. By time-sharing, the series of the three processes are performed with a single encryption/arithmetic circuit without reducing processing efficiency. To this end, it is preferable that the offset of the encrypted data to the time varying coefficient Dtkc correspond to the duration of a minimum size of the encryption block at the shortest. In the case where the DES or C2 standards are employed, the size of the encryption block is 8 bytes, and thus the offset preferably corresponds to at least 8 bytes. This concludes the description of manufacturing the recording medium consistent with the present embodiment. Note that the process to obtain an encryption key unique to each segment (content key Kc) from the time varying coefficient (time varying coefficient Dtkc), the medium-unique key (title key Kt), and the CCI is presented by way of example. It is naturally appreciated that it is applicable to employ any arithmetic operations other than the one described above, and any conversion other than the C2-G conversion.

Figure 10:
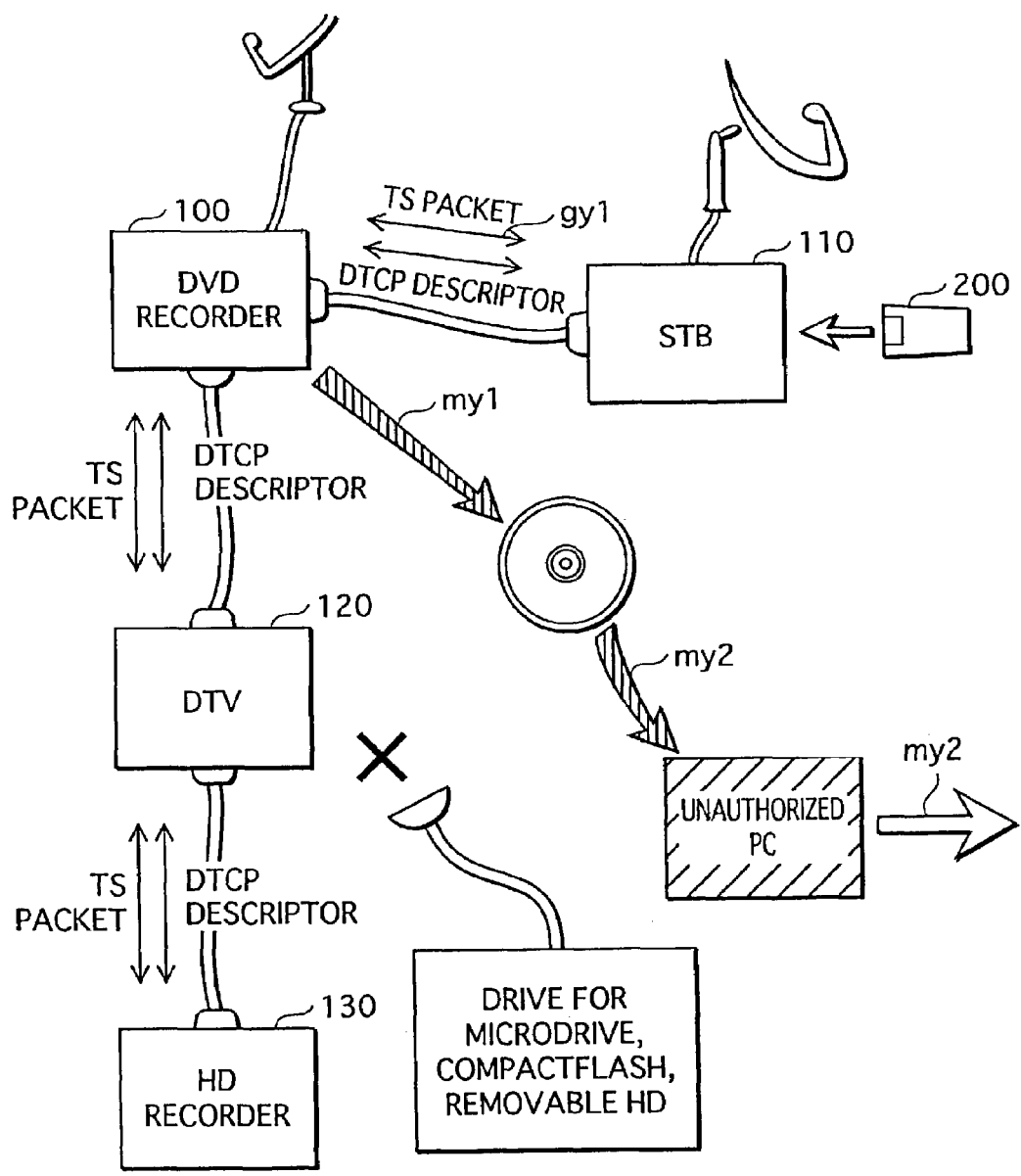
FIG. 10 is a view showing a home network, which is a use environment of the recoding medium and the recording apparatus according to the present invention.

Next, description is given to an embodiment of implementation of a recording apparatus according to the present invention. Similarly to the recording medium, such a recording apparatus is provided on a home network for use by a user. FIG. 10 is a view showing one form of usage of the recording medium on a home network.

As shown in FIG. 10, the DVD recorder 100 receives an MPEG2-TS format digital stream as represented by an arrow gy1 from the STB 110, and coverts the received digital stream to an MPEG2-PS format and writes onto a DVD. In addition, the DVD recorder 100 reads a digital stream written on a DVD and sends it to the digital TV 120 where it is played back. In addition, the DVD recorder 100 reads an MPEG2-PS format digital stream written on a DVD, and converts the digital stream to an MPEG2-TS format and writes on the HD recorder 130.

Upon transmission to another networked appliance, the recording apparatus transmits an MPEG2-TS format digital stream according to a protocol defined by DTCP (Digital Transmission Content Protection) standard. The protocol according to the DTCP standard requires mutual authentication, encryption and decryption of TS packets. Yet, the detailed description thereof is omitted as it is not directly relevant to the gist of the present invention. Appliances that transmit/receive TS packets according to the DTCP standard disconnect an appliance on the other end at the mutual authentication stage if the appliance on the other end fails to meet copy right protection requirements. Consequently, a digital stream is never transmitted (as represented by the mark X in the figure) to a drive for a device such as micro drive and Compact flash.

Upon transmission of a digital stream to another networked appliance, whether the digital stream is permitted to be recorded to a DVD or HD is defined in the DTCP_Descriptor based on the DTCP standard so that the receiving end appliance is informed of the copy control status. FIG. 11 is a view showing one example of such a DTCP_Descriptor. The DTCP descriptor contains: "retention move mode" defining where there is a temporary storage or move mode set for the digital stream; a "retention state" defining the duration of temporally storage; "CCI (Copy Control Information)" defining whether the MPEG2-TS format digital stream is permitted to be copied; an "EPN flag" defining, in the case the CCI indicates the digital stream has a Copy Freely status, whether the digital stream has a Copy Freely or EPN-Asserted Copy Freely status; an "Image Constraint Token" defining whether there is any limitation imposed on the resolution on the MPEG2-TS format digital stream upon playback; and an "APS (Analogue Protection System)" defining whether the digital stream is to be protected upon analogue output. The DTCP_Descriptor is assembled into a TS packet prior to transmission. The CCI and the EPN flag contained in the DTCP_Descriptor are compatible with CCI and an EPN flag contained in an RDI-Pack. The recording apparatus is provided for a user on such a home network.

Figure 12:
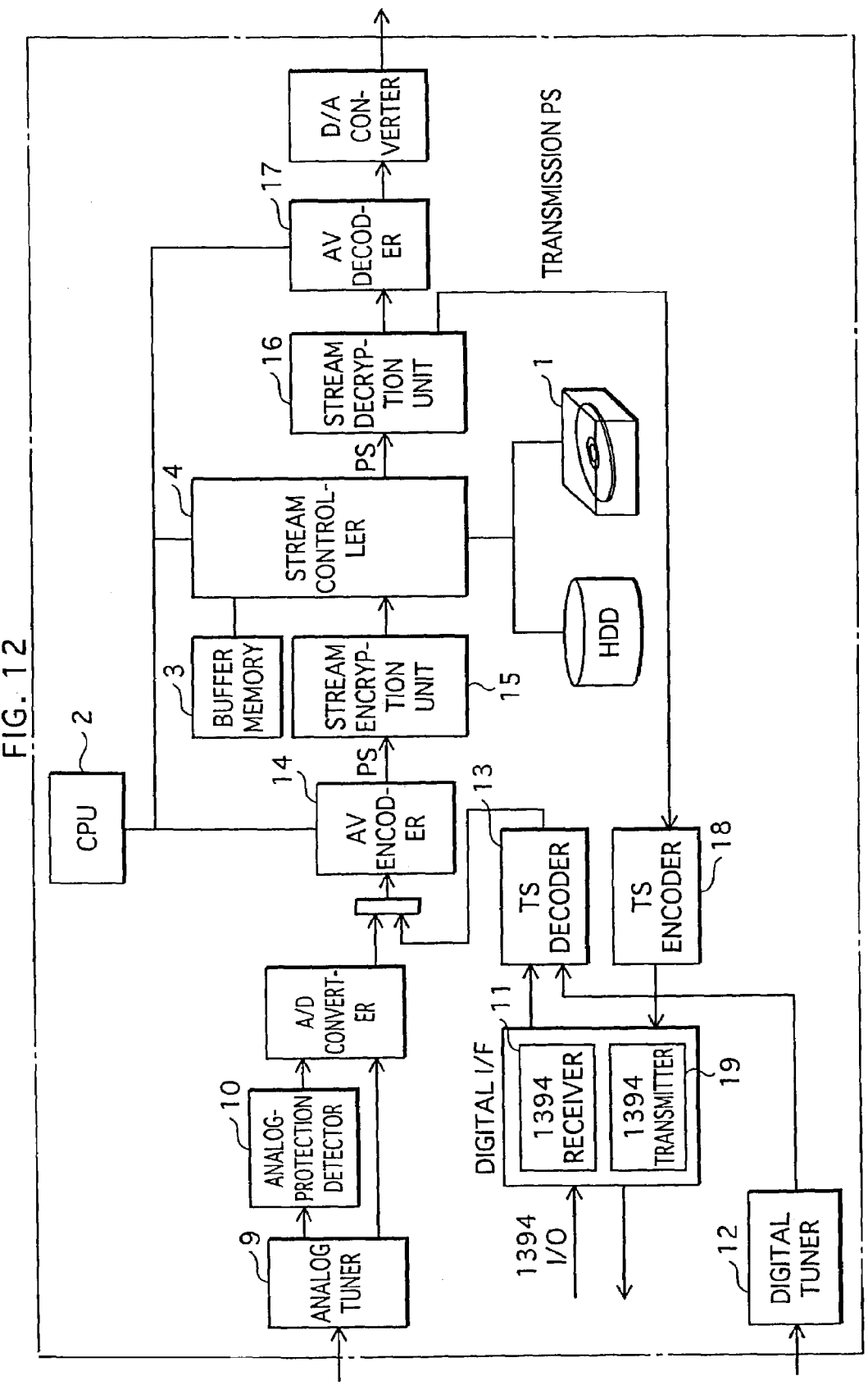
FIG. 12 is a view showing the internal construction of a DVD recorder 100 according to the first embodiment.

Next, description is given to manufacturing of a recording apparatus according to the present invention. The recording apparatus of the present invention is industrially manufactured so as to have the internal construction shown in FIG. 12. Hereinafter, description is given to the internal construction of the recoding apparatus. FIG. 12 is a view showing the internal construction of the DVD recorder 100.

As shown in FIG. 12, the DVD recorder 100 includes a drive 1, a CPU 2, a buffer memory 3, a stream controller 4, an analog tuner 9, an analog-protection detector 10, an IEEE1394 receiver 11, a digital tuner 12, a TS decoder 13, an AV encoder 14, a stream encryption unit 15, a stream detection unit 16, an AV decoder 17, a TS encoder 18, and an IEEE1394 transmitter 19.

To begin with, description is given to the components that are used both to read VOBUs from a DVD and to write VOBUs into a DVD (namely, the drive 1, the buffer memory 3, and the stream controller 4).

The drive 1 is to mount a removable recording medium such as a DVD thereon.

The CPU performs overall control of the recording apparatus.

The buffer memory 3 is to temporarily store VOBUs. VOBUs are once stored into the buffer memory 3 after they are read from a DVD, and before they are written into an HDD or DVD.

The stream controller 4 is connected to the drive 1 and the HDD through an IDE I/F, and performs real-time transmission of VOBUs among the drive 1, the HDD, the buffer memory 3, the stream encryption unit 15, and the stream decryption unit 16.

Figure 13:
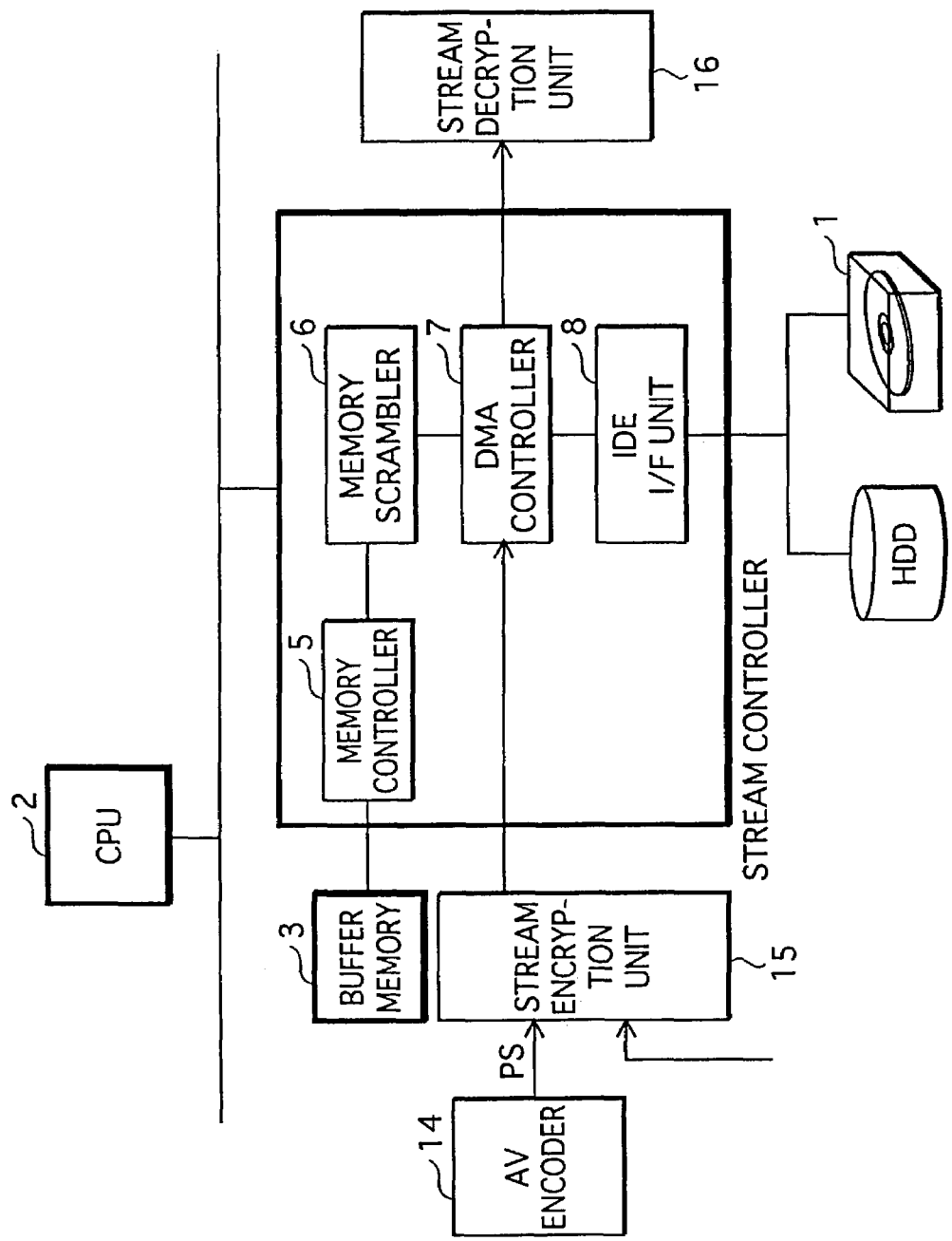
FIG. 13 is a view showing the internal construction of a stream controller 4.

FIG. 13 is a view showing the internal construction of the stream controller 4. As shown in the figure, the stream controller 4 includes a memory controller 5 for performing read/write of the buffer memory 3, a memory scrambler 6 for scrambling and descrambling a VOBU upon read/write of the buffer memory 3, a DMA controller 7 for performing DMA transmission from the stream encryption unit 15 to the buffer memory 3, from the buffer memory 3 to the stream decryption unit 16, and the IDE I/F unit 8 that is an interface between the drive 1 and the HDD.

Figure 14:
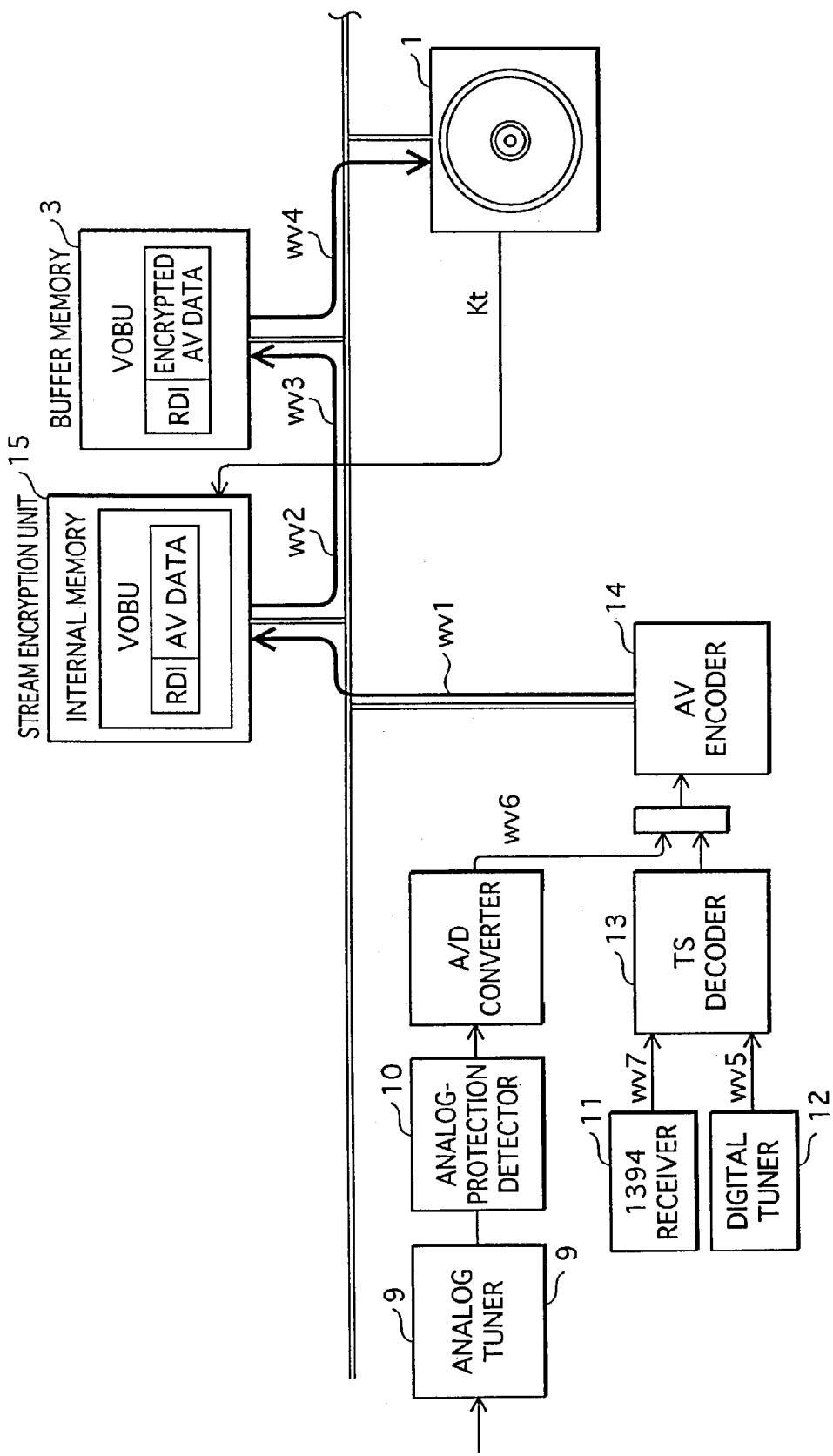
FIG. 14 is a view showing the components, among the components shown in FIG. 12, used to write VOBUs.

Next, description is given to the components that are used to write an MPEG2-PS format digital stream to a DVD. FIG. 14 is a view showing the components used to write data to a DVD. In the figure, the stream controller 4 is illustrated in the form of its internal bus. There are three types of VOBU to be written into a DVD as follows: (1) a VOBU obtained by encoding analog signals inputted to the DVD recorder 100; (2) a VOBU obtained by converting a multi programming MPEG2-TS format digital stream that is inputted to the DVD recorder 100, and (3) a VOBU obtained by converting a digital stream inputted through IEEE139. In FIG. 14, the arrows wv1, wv2, wv3, and wv4 represent the route in which the digital stream defined as (1), (2), and (3) are transmitted to the drive 1, the arrow wv6 represents the route in which analog signals are inputted to the AV encoder 14, the arrow wv5 represents the route in which the digital stream defined as (2) is transmitted to the AV encoder 14, and the arrow wv7 represents the route in which the digital stream defined as (3) is transmitted to the AV encoder 14. Hereinafter, description is given to the components located in those routes (namely, the analog tuner 9, the analog-protection detector 10, the IEEE 1394 receiver 11, the digital tuner 12, the TS decoder 13, the AV encoder 14, and the stream encryption unit 15).

The analog tuner 9 receives analog broadcast signals to obtain analog video signals and analog audio signals. The analog tuner 9 then outputs these analog signals to the AV encoder 14 through an A/D converter.

The analog-protection detector 10 detects analog protection signals, such as CGMS-A, macro vision, and color stripe, that are imposed on analog broadcast signals in a vertical blanking interval (VBI) thereof.

The IEEE1394 receiver 11 receives TS packets that are inputted from another component through IEEE1394 in accordance with the DTCP_Descriptor, and then outputs the TS packets to the TS decoder 13. Here, in the case where the DTCP_Descriptor contains the CCI that indicates "No More Copy", the IEEE1394 receiver 11 does not perform the receiving operation. This is because, when containing CCI indicating "No More Copy", the MPEG2-TS format digital stream is transmitted on the home network with an intention to be played back by a digital TV, and thus to be prohibited from being recorded onto a DVD. Upon receipt of TS packets, the IEEE1394 receiver 11 passes the received DTCP_Descriptor to the AV encoder 14. In response, the AV encoder 14 sets the CCI and the EPN flag in the RDI-Pack in accordance with the CCI and the EPN flag as defined in the DTCP_Descriptor.

The digital tuner 12 receives broadcast waves to obtain a digital stream in a multi programming TS format.

The TS decoder 13 demultiplexes the multi programming TS format digital stream that is obtained by the digital tuner 12, and outputs to the AV encoder 14 a video stream, an audio stream, and service information having been time-division multiplexed into the TS packets. The service information is outputted for the use by the IEEE1394 receiver 11 to set the CCI and the EPN flag contained in the RDI-Pack accordingly. The demultiplexing by the TS decoder 13 is performed for each TS packet obtained by the IEEE1394 receiver 11. In other words, the TS decoder 13 demultiplexes TS packets obtained by the IEEE1394 receiver 11 thereby obtaining a video stream and an audio stream, and then outputs the obtained streams to the AV encoder 14.

The AV encoder 14 performs compression coding of video and audio signals that are demodulated by the tuner and digitized by the A/D converter, thereby obtaining video and audio data each corresponding to 0.4-1.0 sec. Further, the AV encoder 14 multiplexes the thus obtained video and audio data to obtain VOBUs. In addition, the AV encoder 14 multiplexes the video and audio streams obtained by the digital tuner 12 and the TS decoder 13 to obtain VOBUs. Upon obtaining VOBUs, the AV encoder 14 generates the RDI-Pack by setting the CCI in accordance with the results of detection by the analog-protection detector 10, the DTCP-Descriptor and the service information received from the IEEE1394 receiver 11 and the digital tuner 12, respectively. The setting is based on the CGMS-A, the CCI defined in the DTCP_Descriptor, and the service information.

The stream encryption unit 15 obtains a content key Kc and a code Dveri using a title key Kt, the CCI, and the time varying coefficient Dtkc. The stream encryption unit 15 then encrypts the VOBU using the content key Kc in the C2-ECBC mode and stores the encrypted VOBU in the buffer memory 3. The VOBU stored in the buffer memory 3 is written by the drive 1 on the DVD.

As long as there continues input of analog broadcast signals or of TS packets that constitute the MPEG2-TS format digital stream, the components from the analog tuner 9 and the stream encryption unit 15 repeatedly perform the above operations. Thus, the digital stream is recorded in the MPEG2-PS format.

Figure 15:
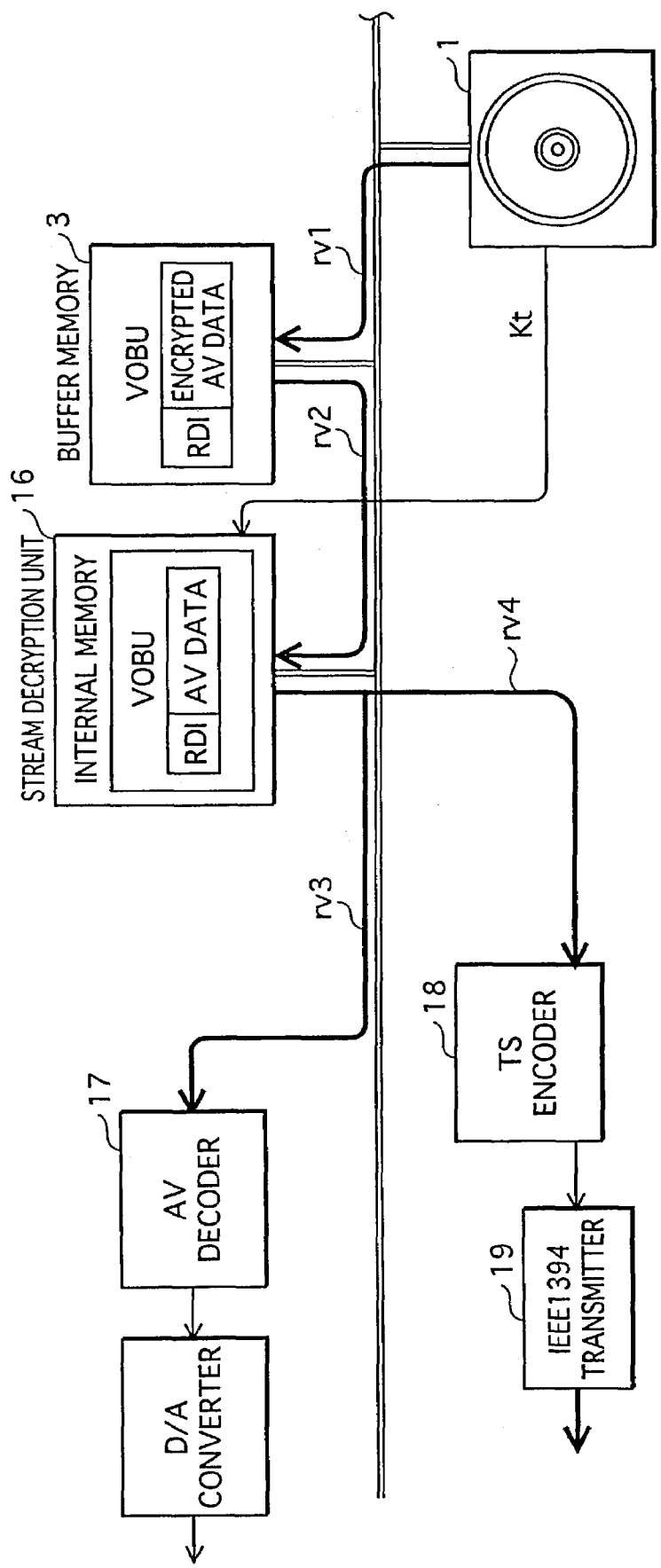
FIG. 15 is a view showing the components, among the components shown in FIG. 12, used to read VOBUs.

This concludes the description of the components used to write VOBUs. Next, description is given to components used to read VOBUs. There are following two types of VOBUs that are read from a DVD: (1) VOBUs that are played back as audio visual data by the AV decoder 17, and (2) VOBUs that are transmitted to another networked appliance via IEEE1394. FIG. 15 is a view showing the components, among the components shown in FIG. 12, that are used to read VOBUs. In the figure, the stream controller 4 is illustrated in the form of its internal bus. Arrows rv1 and rv2 in the figure show the route in which the VOBUs of the types (1) and (2) are read from a DVD and transmitted to the stream decryption unit 16. An arrow rv3 shows the route in which the type (1) VOBUs are transmitted to the AV decoder 17 where they are played back. An arrow rv4 shows the route in which the type (2) VOBUs are outputted to another component through IEEE1394. Hereinafter, description is given to the components used to read VOBUs (namely, the AV decoder 17, and the TS encoder 18, the IEEE1394 transmitter 19).

The stream decryption unit 16 obtains a content key Kc and a code Dveri using a title key Kt, the CCI, and the time varying coefficient Dtkc, and then decrypts a VOBU using the content key Kc in the C2-DCBC mode.

The AV decoder 17 performs MPEG2 compliant decompression on the VOBUs that are decrypted by the stream decryption unit 16 to obtain video and audio signals to play back.

The TS encoder 18 converts the VOBUs that are decrypted by the stream decryption unit 16 into TS packets and outputs the TS packets to the IEEE1394 transmitter 19.

The IEEE1394 transmitter 19 encrypts the TS packets obtained through conversion performed by the TS encoder 18 according to the DTCP standard to output.

Figure 16:
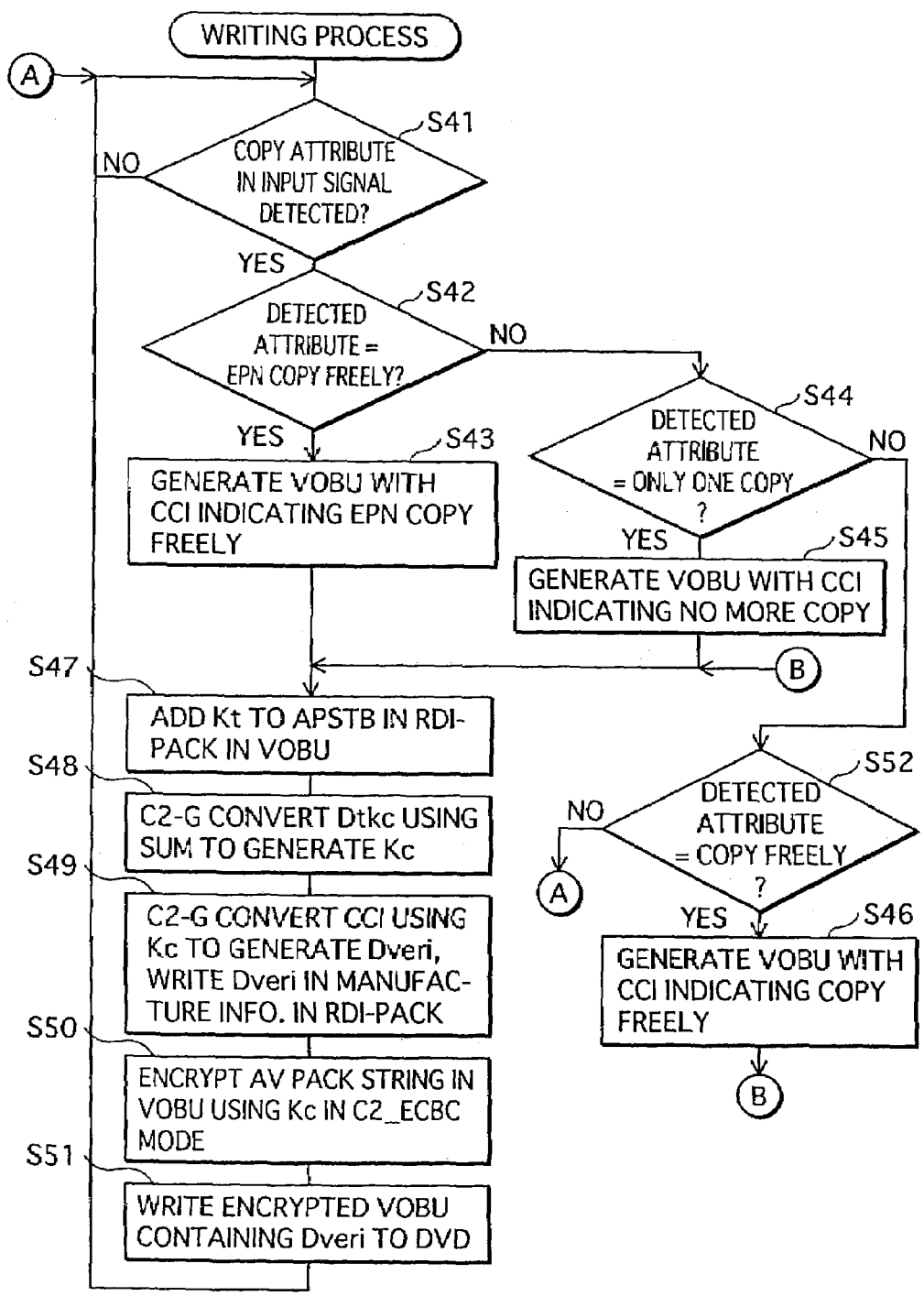
FIG. 16 is a flowchart showing the overall control performed upon writing process according the first embodiment.

Overall control of the recording apparatus having the above construction is performed by the CPU 2 executing the program shown in FIG. 16. Hereinafter, with reference to the flowchart shown in FIG. 16, description is given to the process steps performed by the CPU 2 upon writing VOBUs.

Steps S41-S45 shown in FIG. 16 form a loop that is performed to generate a VOBU in response to input signals to the DVD recorder 100. The input signals may be analog signals, digital broadcast signals, or signals inputted from another networked component. The copy attribute is copy permission/prohibition setting indicated by CGMS-A, the service information, the CCI defined by the DTCP_Descriptor and the EPN flag.

The step S41 in the loop is to monitor whether the copy attribute of input signals has been detected. Upon completion of the copy attribute detection, the processing goes onto the step S43, S45, or S46 to generate a VOBU.

Which of the steps S43, S45, S46 is performed is determined through three judgment steps S42, S44, and S52.

The step S43 is performed to obtain a VOBU when the copy attribute of the input signals from an external apparatus indicates EPN-Asserted Copy Freely status (step S42, YES). Obtained in the step S43 is a VOBU composed of: RDI-Pack containing CCI that indicates EPN-Asserted Copy Freely; and an AV pack string (step S43).

The step S45 is performed when the copy attribute indicates Only One Copy (step S44, YES). In the step S45, the Only One Copy attribute is altered to the No More Copy attribute, and then obtain a VOBU. The VOBU obtained thereby is composed of: RDI-Pack containing CCI that indicates No More Copy; and an AV pack string (step S45).

The step S46 is performed when the copy attribute is Copy Freely without any condition (step S52, YES) to record a VOBU. The VOBU record a VOBU containing the CCI that indicates the Copy Freely attribute. Here, copyright protection may be provided more firmly by alternating the copy attribute to EPN-Asserted Copy Freely, and thus the resulting VOBU includes CCI that indicates EPN-Asserted Copy Freely.

When the copy attribute as detected indicates No More Copy, the processing goes back to the step S41 to wait for the next copy attribute is to be detected.

Once a VOBU is obtained thorough the above steps, the CPU 2 performs steps S47-S51 and goes back to the step S21.

Through the steps S47-S51, the CPU 2 adds the APSTB contained in the RDI-Pack in the VOBU and the title key Kt (step S47), and C2-G converts the time varying coefficient Dtkc using the sum, thereby obtaining a content key Kc (step S48), and C2-G converts the CCI using the content key Kc, thereby obtaining a code Dveri, and then places the obtained code Dveri into the Manufacture Information in the RDI-Pack (step S49), encrypts the AV pack string in the VOBU using the content key Kc based on the C2_ECBC mode (step S50), and finally writes the VOBU that is encrypted and that contains the code Dveri into the DVD (step S51). By repeatedly performing the steps S41-S51, VOBUs are written one by one into the DVD.

Figure 17:
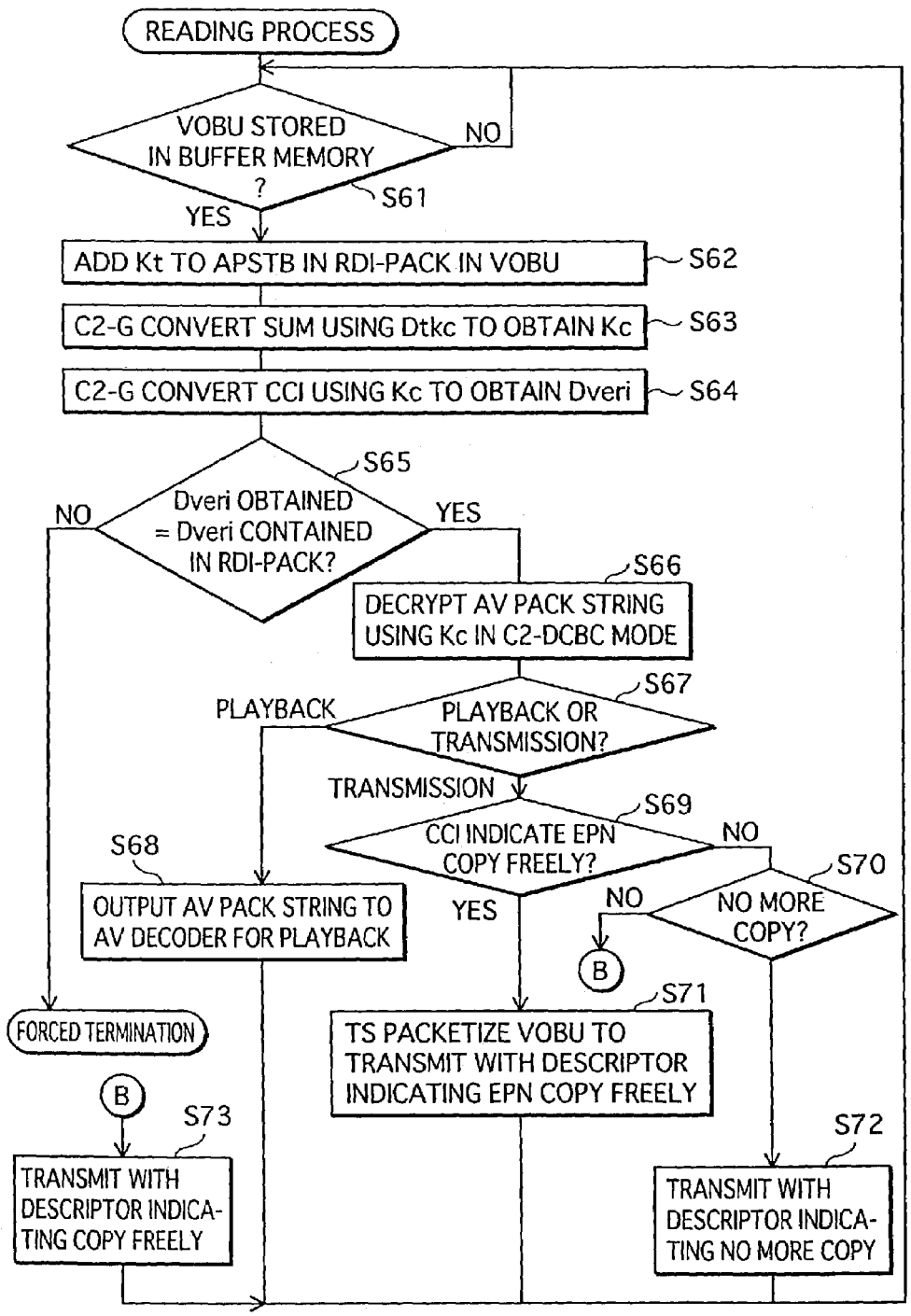
FIG. 17 is a flowchart showing the overall control performed upon reading process according the first embodiment.

Next, with reference to the flowchart shown in FIG. 17, description is given to the processing steps performed by the CPU 2 to read VOBUs.

The process shown in the flowchart in FIG. 17 is to wait for a VOBU to be stored into the buffer memory 3 (step S61), to perform steps S62-S71 once the VOBU is stored therein, and to go back to the step S61.

Through the steps S62-S71, the CPU 2 adds the APSTB contained in the RDI-Pack in the VOBU to the title key Kt (step S62), C2-G coverts the time varying coefficient Dtkc using the sum, thereby obtaining the content key Kc (step S63), and C2-G converts the CCI using the content key Kc, thereby obtaining a code Dveri (step S64).

In the step S65, the CPU 2 judges whether the code Dveri generated in the step S64 matches the code Dveri present in the RDI-Pack. If the two codes Dveri do not match, the CPU displays the situation on a front panel or a TV monitor of the recording apparatus, and then force terminates the reading operation in process. This is an action to be forcefully taken when any illicit act is detected.

Here, rather than forcefully taking such an action, a more flexible action may be taken. For example, when the two codes Dveri do not match, to be prohibited from being played back or transmitted is only the current VOBU, and processing of the succeeding VOBUs are continued in the same manner.

On the other hand, if the two codes Dveri match, the CPU 2 decrypts the encrypted AV pack string in the VOBU using the content key Kc based on the C2-DCBC mode (step S66).

Thereafter, different steps are performed depending on whether the decrypted AV pack string is to be played back or transmitted. To play back the decrypted AV pack string (step S67, PLAYBACK), CPU 2 extracts TS packets out of 32 EX-appended TS packets to output to the AV recorder 17 where the TS packets are played back (step S68). To transmit the decrypted AV pack string, the CPU 2 judges whether the CCI contained in the RDI-Pack indicates EPN-Asserted Copy Freely, No More Copy, or Copy Free without any condition, and performs different processes according to the judgments (steps S69 and S70).

Judging that the CCI indicates EPN-Asserted Copy Freely (step S69, YES), the CPU 2 converts the VOBU into TS packets and transmits the TS packets along with the DTCP_Descriptor that indicates EPN-Asserted Copy Freely (step S71). Judging that the CCI indicates No More Copy (step S70, YES), the CPU 2 converts the VOBU into TS packets and transmits the TS packets along with the DTCP_Descriptor that indicates No More Copy (step S72). Judging that the CCI indicates Copy Freely on any condition (step S70, NO), the CPU 2 converts the VOBU into TS packets and transmits the TS packets along with the DTCP_Descriptor that indicates Copy Freely (step S73). To provide copyright protection more firmly, to be transmitted in the step S73 along with the TS packets is the DTCP_Descriptor that indicates EPN-Asserted Copy Freely.

As described above, according to the present embodiment, while maintaining compatibility with a model that is compliant to an existing standard only, any illicit act, such as tampering of CCI or replacing of RDI-Pack are detected by matching check the code-Dveri. Thus, unauthorized copying is effectively prohibited.

Second Embodiment

The first embodiment described above has a focus on protecting, with the use of the code Dveri, the CCI from being tampered. A second embodiment is directed to an improvement for protecting CCI tampering without using the code Dveri. This improvement is achieved by generating a content key Kc from the entire CCI rather than from APSTB only.

Figure 18:
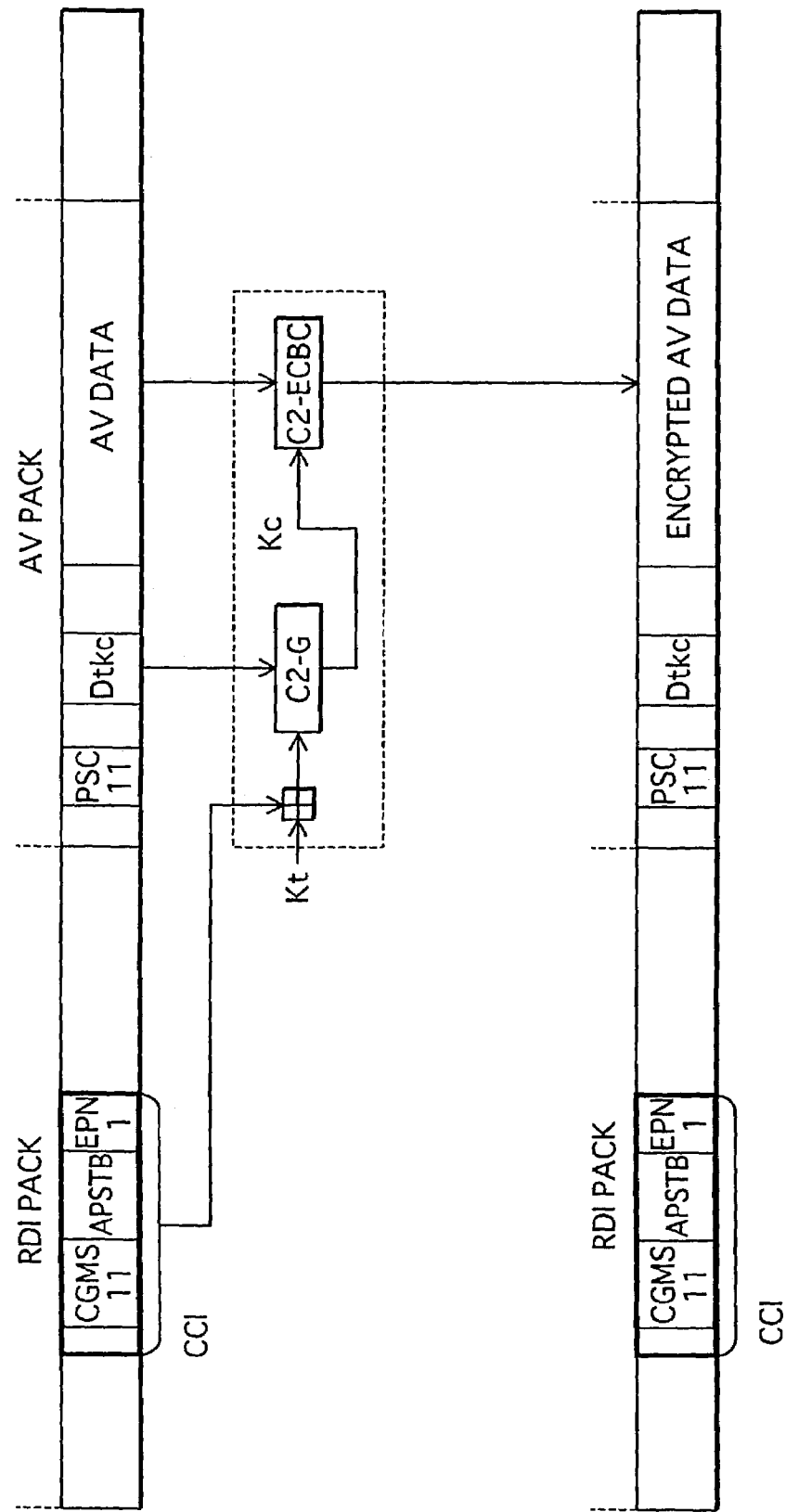
FIG. 18 is a view showing, in a similar manner to FIG. 7, the encryption process through which a content key Kc is generated from the entire CCI.

FIG. 18 is a view showing, in a similar manner to FIG. 7, the encryption process for generating a content key Kc from the entire CCI. According to the present embodiment, although the compatibility is not maintained with an appliance that is compliant with an existing standard, tampering of CCI is prevented without using a code Dveri. Suppose CCI is altered, a content key Kc generated by an appliance in attempt to decrypt a content would greatly differ from an original content key Kc, so that the content is not decrypted properly.

Without the need for a code Dveri, the offset of AV data from a time varying coefficient Dtkc is shortened by the length of time that would otherwise taken for generating a Dveri.

Third Embodiment

The first and second embodiments are directed to recordation of an MPEG2-PS format digital stream into a recording medium. In a third embodiment, it is an MPEG2-TS format digital stream that is recorded on a recording medium.

An MPEG2-TS format digital stream is suitable to be recoded on an HD or a Blu-ray disc.

First, description is given to how GOPs as described in the first embodiment are converted to an MPEG2-TS format digital stream upon recordation onto a recording medium.

Figure 19:
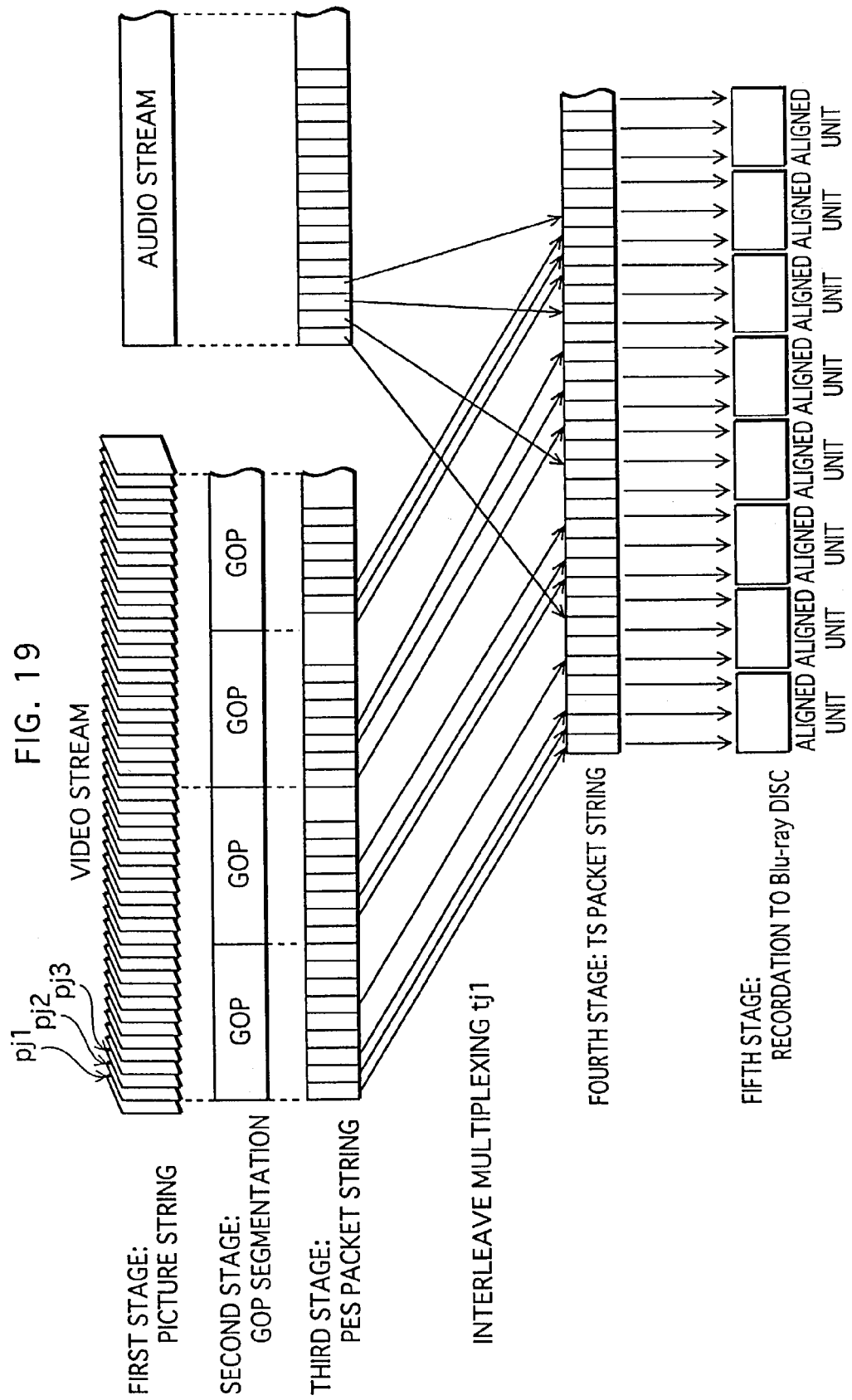
FIG. 19 is a view showing the construction of a digital stream recordable on a Blu-ray disc in different stages that are more and more detailed.

FIG. 19 is a view showing the construction of a digital stream recordable on a Blu-ray disc in different stages that are more and more detailed. In FIG. 19, the first through third stages are identical to those shown in FIG. 2, and show a picture string, a GOP segmentation, a PES packet string, respectively. The fourth and fifth stages greatly differ from those in FIG. 2. The PES packet string assembled from the GOP string are interleaved multiplexed (tj1 in the figure) with the PES packet string that are assembled from the audio stream, so that the MPEG2-TS format digital stream shown in the fourth stage is generated. Video and audio streams constituting a TV program are transmitted in the form shown in the fourth stage via a transmission path such as satellite broadcasting waves, terrestrial broadcasting waves, and a cable for CATV.

Figure 20:
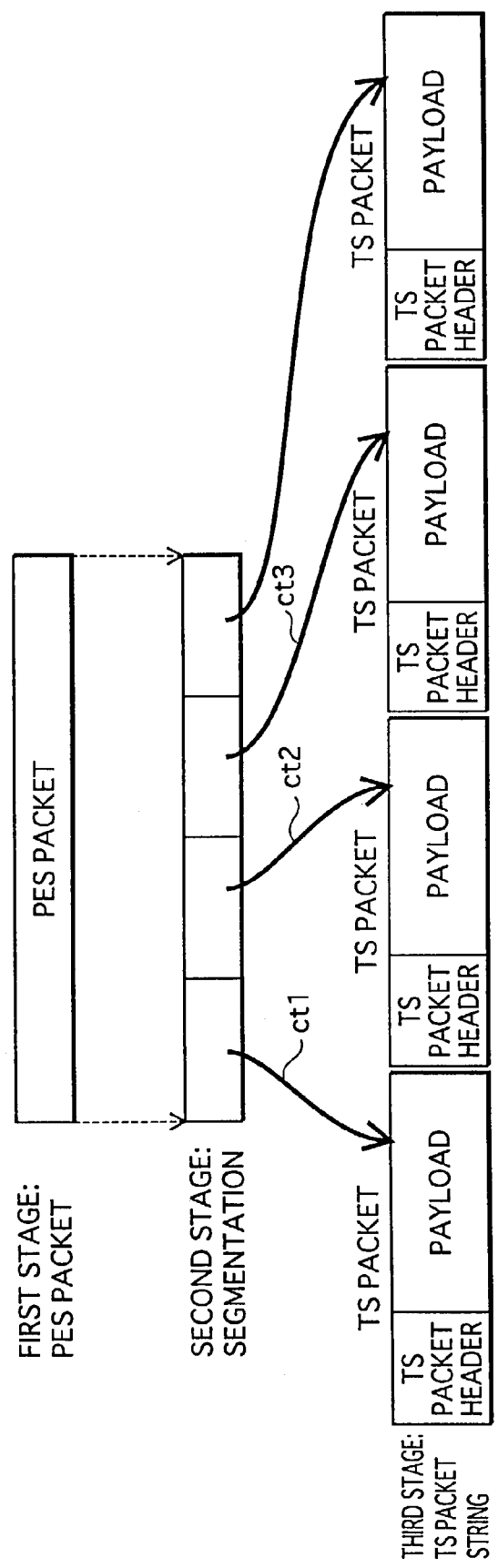
FIG. 20 is a view showing the internal construction of a TS packet.

Next, description is given to the internal structure of a TS packet. The third stage in FIG. 20 shows the construction of a TS packet. As shown in the figure, each TS packet is composed of a "TS packet header" and a "payload", and has a size of 188 bytes. A "payload" contains a piece of PES packet. In the figure, the PES on the first stage is divided into a plurality of pieces shown on the second stage, and each payload shown in the third stage contains a piece as represented by arrows ct1, ct2, and ct3. This concludes the description of TS packets.

Next, description is given to how an MPEG2-TS format stream is recorded onto a Blu-ray disc. FIG. 21 is a view showing the process through which the TS packets constituting an MPEG2-TS format digital stream are recorded onto a Blu-ray disc. The first stage in the figure shows the TS packets constituting an MPEG2-TS format digital stream.

As shown in the second stage, each TS packet is appended a TP_extra_header (labeled as "EX" in the figure).

The third and fourth stages show the relation between a physical sector of a Blu-ray disc and TS packets. As shown in the fourth stage, there is a plurality of sectors formed on a Blu-ray disc. TS packets each appended an extra_header (hereinafter, referred to as EX-appended TS packet) are grouped together in every 32 EX-appended TS packets, and written in three consecutive sectors of the Blu-ray disc. The size of each group containing 32 EX-appended TS packets is 6144 bytes (=32×192), which is equal to the total size of three sectors, 6144 bytes (=2048×3). Each group of 32 EX-appended TS packets that is recorded in three sectors is referred to as an "Aligned Unit", and the digital stream is encrypted by the Aligned Unit upon recordation onto a Blu-ray disc. On the third stage shown in the figure, an error-correcting code is appended to every $16^{th}$ sector, thereby forming an ECC block. With this construction, it is assured that a recording apparatus always obtains a complete set of 32 EX-appended TS packets as long as the appliance accesses a Blu-ray disc using an Aligned Unit.

Figures 22A, 22B:
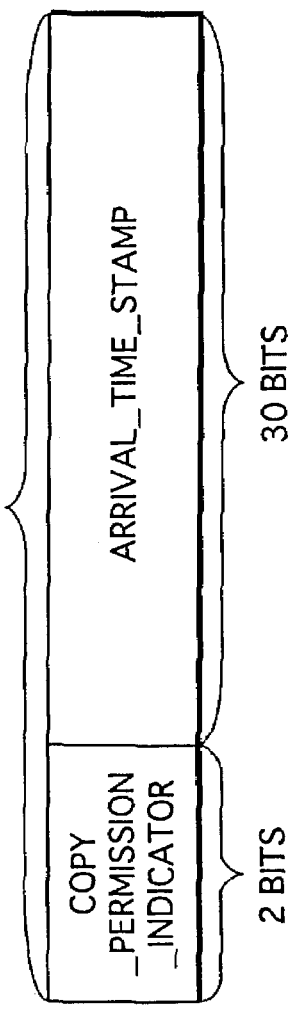
FIG. 22A is a view showing the internal construction of a TP_extra_header.
FIG. 22B is a view showing four different values that a copy_permission_indicator possibly takes along with the meaning assigned to each value.

This concludes the description of writing process of an MPEG2-TS format digital stream to a Blu-ray disc. Now, description is given to the internal construction of a TP_extra_header. FIG. 22A shows the internal construction of a TP_extra_header.

As shown in the figure, each TP_extra_header contains an "Arrival_Time_Stamp" and a "copy_permission_indicator".

The "Arrival_Time_Stamp" acts as a time varying coefficient in an MPEG2-TS format digital stream. That is because the value of "Arrival_Time_Stamp" differs depending on where a corresponding Aligned Unit is located in the playback time axis of the digital stream. The "Arrival_Time_Stamp" represents a time at which the TS packet arrives at the recording apparatus, and used upon playback of the data stream for a time stamp, such as PCR, and PTS. Generally, a time stamp such as PCR and PTS for an MPEG2-TS format digital stream transmitted from a broadcast station is set on an assumption that the digital stream is received and played back in real time. However, when an MPEG2-TS digital stream is once stored in a Blue-ray Disc or HD for time-shift viewing, the digital stream is played back after a relatively long time since the accumulation. In the case of time-shift viewing, the PCR and PTS set for the purpose of real-time viewing are no longer usable. For this reason, the Arrival_Time_Stamp in the TP_extra_header is provided to show time at which the TS packet arrives at the recording apparatus. With the use of the Arrival_Time_Stamp, even for time-shift viewing an MPEG2-TS digital stream once stored in a Blu-ray disc, the MPEG2-TS digital stream is played back at playback timing provided by PTS and PCR in the same manner as real time viewing.

The "copy_permission_indicator" acts as CCI for an MPEG2-TS format digital stream. In the case of recordation to a Blu-ray disc, copy management is set separately for each TS packet. The "copy_permission_indicator" is a 2-bit data that possibly takes four different values each assigned the following meaning as shown in FIG. 22B. The bit set "11" indicates that the TS packet has the Copy Freely status without any condition, "11" indicates the No More Copy status, "01" indicates that TS packet is encrypted but permitted to be freely copied, and "10" indicates the EPN-Asserted Copy Freely status.

Figure 23:
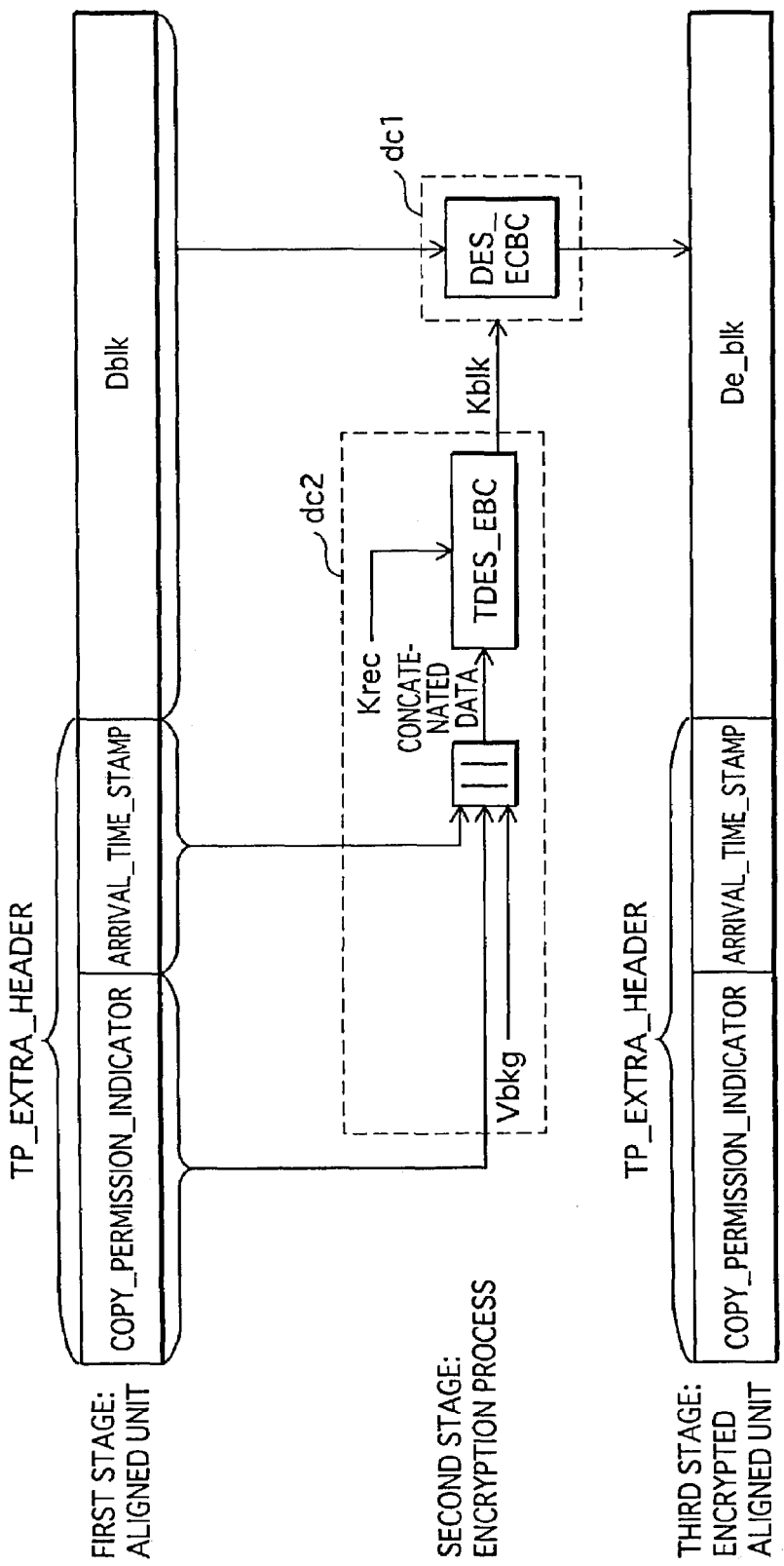
FIG. 23 is a view showing the process through which each Aligned Unit is encrypted.

FIG. 23 is a view showing the process through which each Aligned Unit is encrypted. The first stage in FIG. 23 shows a pre-encoded Aligned Unit. Before encoded, the 6144-byte Aligned Unit is composed of a TP_extra_header of a first EX-appended TS packet, and Dblk that follows. Dblk is a 6136-byte data (6144-8) that remains in the Aligned Unit after excluding the 8-byte TP_extra_header.

The third stage shows the encoded Aligned Unit. Remaining in plaintext, there is no change in the TP_extra_header of the first EX-appended TS packet compared to that in the pre-encrypted Aligned Unit. Dblk is converted to De_blk.

A dotted box dc1 in the figure shows the encryption process of Dblk. Dblk is encrypted using a 64-bit block key Kblk in the DES_ECBC mode. This key Kblk corresponds to the content key Kc described in the first embodiment in the sense that the block key Kblk is also unique to each unit, so that every unit has a different block key Kblk.

Encryption in the DES_ECBC mode is to first divide the 6136-byte Aligned Unit into a plurality of pieces each having 64 bits or less, and encrypt each piece one by one. The DES_ECBC mode is understood to be similar to the C2_ECBC mode used in the first embodiment. Decryption carried out by reversely performing the above steps is referred to as a DES_DCBC mode.

A dotted box dc2 in the figure shows the process through which the 64-bit block key Kblk is generated. The symbol "||" in the figure represents a concatenation operation. The concatenation operation is one of predetermined operations, and corresponds to the addition performed in the first embodiment to the title key Kt and the CCI. The concatenation operation is performed using the 2-bit copy_permission_indicator, the 30-bit Arrival_Time_Stamp, and the 32-bit parameter Vbkg. The block key Kblk is obtained by encrypting the concatenated data (64 bits) with the 128-bit recording key Krec in the TDES_E mode.

The parameter Vbkg is a common parameter furnished to all appliances having copyright protection capability.

Further, the recording key Krec is an encryption key that corresponds to the title key Kt used in the first embodiment, and unique to each recording medium. The recording key Krec is derived from a plurality of parameters contained in the Blu-ray disc, and a plurality of parameters contained in the apparatus. Yet, any further description is not given since it is not directly relevant to the gist of the present invention.

The process of generating the block key Kblk in the TDES_E mode is given in the following expression.

Block Key $Kblk = DES\_E(K1, DES\_D(K2, DES\_E(K1, d)))$ wherein, K1 represents the 64 most-significant bits of the recording key Krec, K2 represents the 64 least-significant bits of the recording key Krec, DES_E represents DES encryption in the ECB (Electric Codebook) mode, and DES_D represents DES encryption in the ECB (Electric Codebook) mode.

The block key Kblk is generated by the DES encryption in the TDES_E mode in which the encryption is repeated for three times.

To provide copyright protection even more firmly, a block key may be generated for each TS packet rather than for each Aligned Unit. Yet, to generate a block key Kblk for each TS packet, it is required to perform the TDES_E mode encryption for each TS packet, which results in heavy processing load. In view of this, the block key Kblk in the present embodiment is generated for each Aligned Unit. Each Aligned Unit contains 32 TS packets, and is recorded in 3 sectors. That is, one block key Kblk is generated for every 3 sectors, so that load imposed on the apparatus is reduced.

Next, description is given to the internal construction of the recording apparatus according to the present embodiment.

Figure 24:
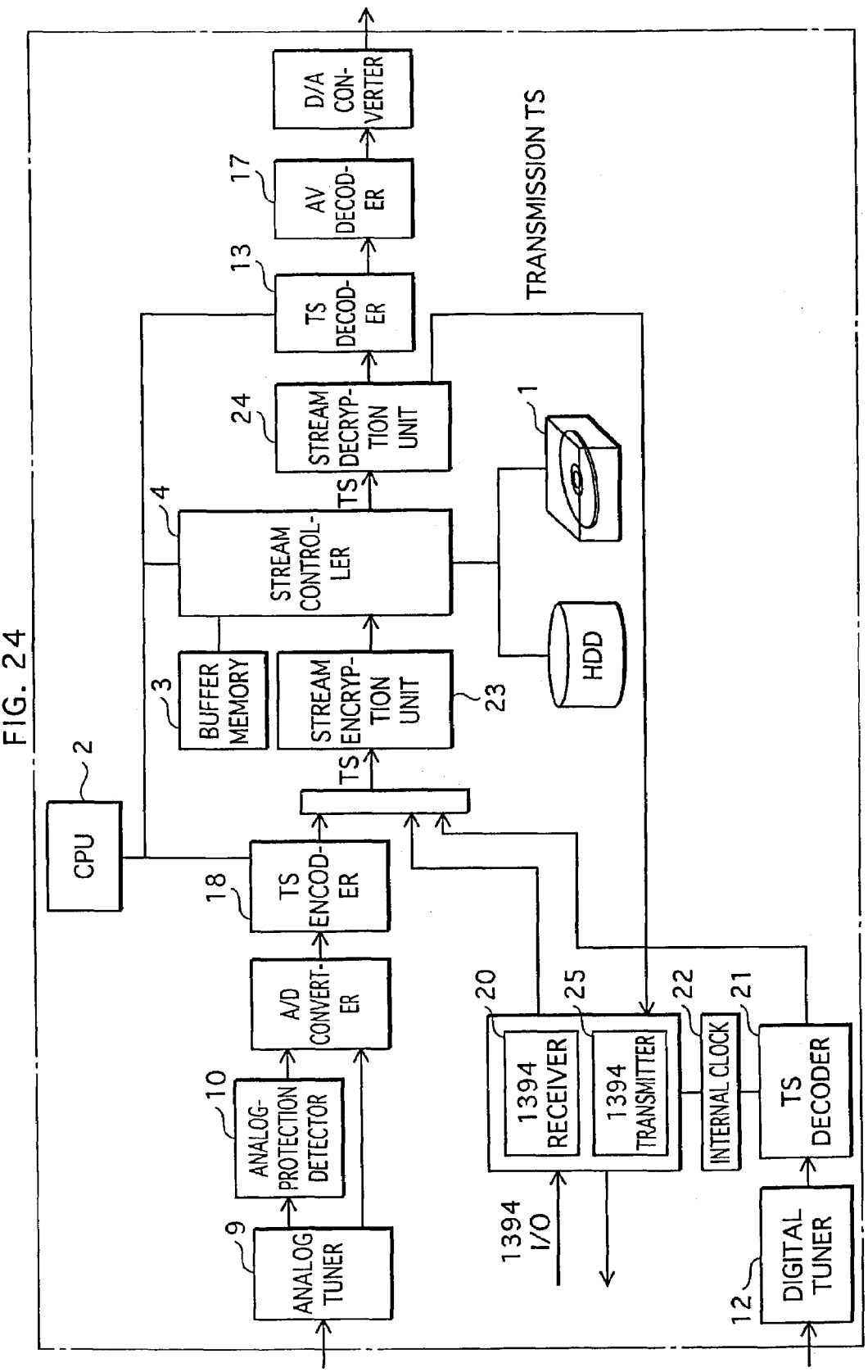
FIG. 24 is a view showing the internal construction of the recording apparatus according to the third embodiment.

FIG. 24 is a view showing the internal construction of the recording apparatus according to the third embodiment. As shown in the figure, the TS encoder 18 is connected to the analog tuner 9 and the analog-protection detector 10 at their output ends. Since an MPEG2-TS format digital stream is directly recorded in a Blur-ray disc, it is sufficient that the TS encoder 18 is connected to the output ends of the analog tuner 9 and the analog-protection detector 10. Further, the TS decoder 13 is connected to the input end of the AV decoder 17 rather than the output ends of the IEEE receiver 11 and the digital tuner 12. Since a Blu-ray disc can directly store an MPEG2-TS format digital stream, there is no need to convert a digital stream to video and audio streams. Still further, the stream encryption unit 15 and the stream decryption unit 16 are replaced with a stream encryption unit 23 and a stream decryption unit 24, respectively. The IEEE1394 transmitter 11 and the IEEE1394 receiver 19 are replaced with IEEE1394 transmitter 20 and the IEEE1394 receiver 25, respectively. Further, a TS decoder 21 is added to the output end of the stream controller 4.

Figure 25:
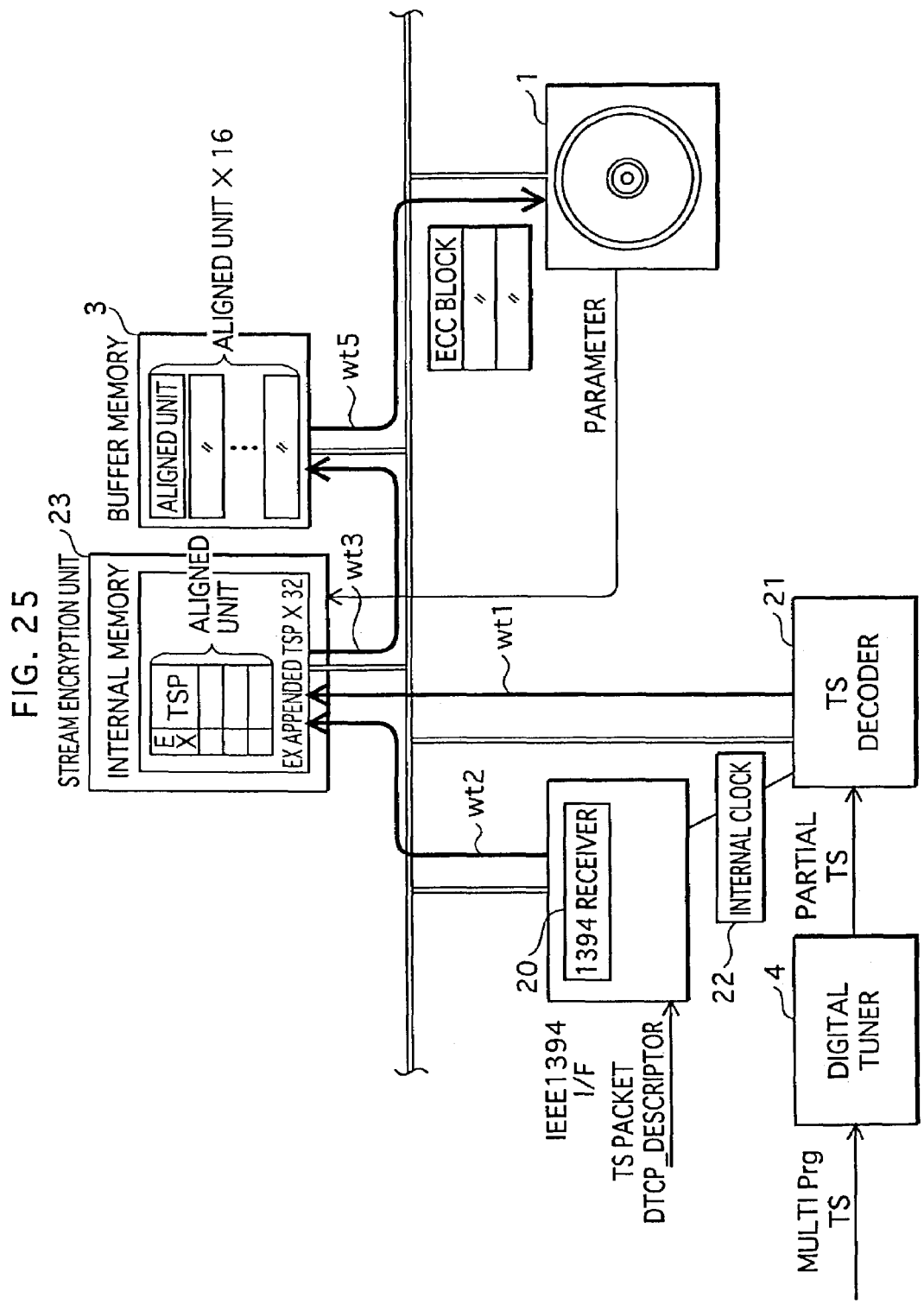
FIG. 25 is a view showing, among the components shown in FIG. 24, components used in data writing.

Next, description is given to components used to write an MPEG2-TS format digital stream to a Blu-ray Disc. FIG. 25 is a view showing, among the components of the recording apparatus of the third embodiment, components used in data writing (namely, from the IEEE1394 receiver 20 to the stream encryption unit 23) in the same manner as FIG. 14. Now, description is given to the IEEE1394 receiver 20 and the stream encryption unit 23 and the components residing therebetween.

The IEEE1394 receiver 20 receives TS packets transmitted thereto via IEEE1394 according to DTCP. TS packets inputted via IEEE1394 contain an isochronous packet inserted thereto as appropriate. Upon receipt of an isochronous packet, the IEEE1394 receiver 20 generates Arrival_Time_Stamp based on the time clocked by the internal clock 22 at the instant. In the case where the isochronous packet inputted via IEEE1394 is generated at a transmitting end based on an Arrival_Time_Stamp, the Arrival_Time_Stamp generated by the IEEE1394 receiver 11 is approximately equal to the transmitting-end Arrival_Time_Stamp. A TP_extra_header containing the thus generated Arrival_Time_Stamp and the copy_permission_indicator is appended to each TS packet, thereby obtaining EX-appended TS packets.

The digital decoder 21 demultiplexes the multi programming format TS outputted from the digital tuner 12 to obtain TS packets. Once TS packets are obtained, the TS decoder 21 generates a TP_extra_header to append to each TS packet. To generate the TP_extra_header, the TS decoder 21 refers to service information of a TV program to which the currently processing TS packet belongs, and generates, based on the service information, a copy_permission_indicator for the TP_extra_header to contain. An arrival_Time_Stamp for the TP_extra_header is generated based on the time clocked by the internal clock 22 at the instant when the TS packet arrives at the recording apparatus.

The stream encryption unit 23 generates a recording key Krec using predetermined parameters. The parameters are pre-stored in the Blu-ray disc and the recording apparatus. Thereafter, each time an Aligned Unit is loaded to the buffer memory 3, the stream encryption unit 23 concatenates the copy_permission_indicator, the Arrival_Time_Stamp each for that Aligned Unit, and the parameter Vbkg, and then encrypts the 64-bit concatenated data using the recording key Krec in the TDES_E mode to obtain a 64-bit block key Kblk. Once the block key Kblk is obtained in the above manner, the stream encryption unit 23 encrypts that Aligned Unit except the TP_extra_header, so that De_blk is obtained. The thus encrypted Aligned Unit is stored first into the buffer memory 3 and then recorded to the Blu-ray disc.

Figure 26:
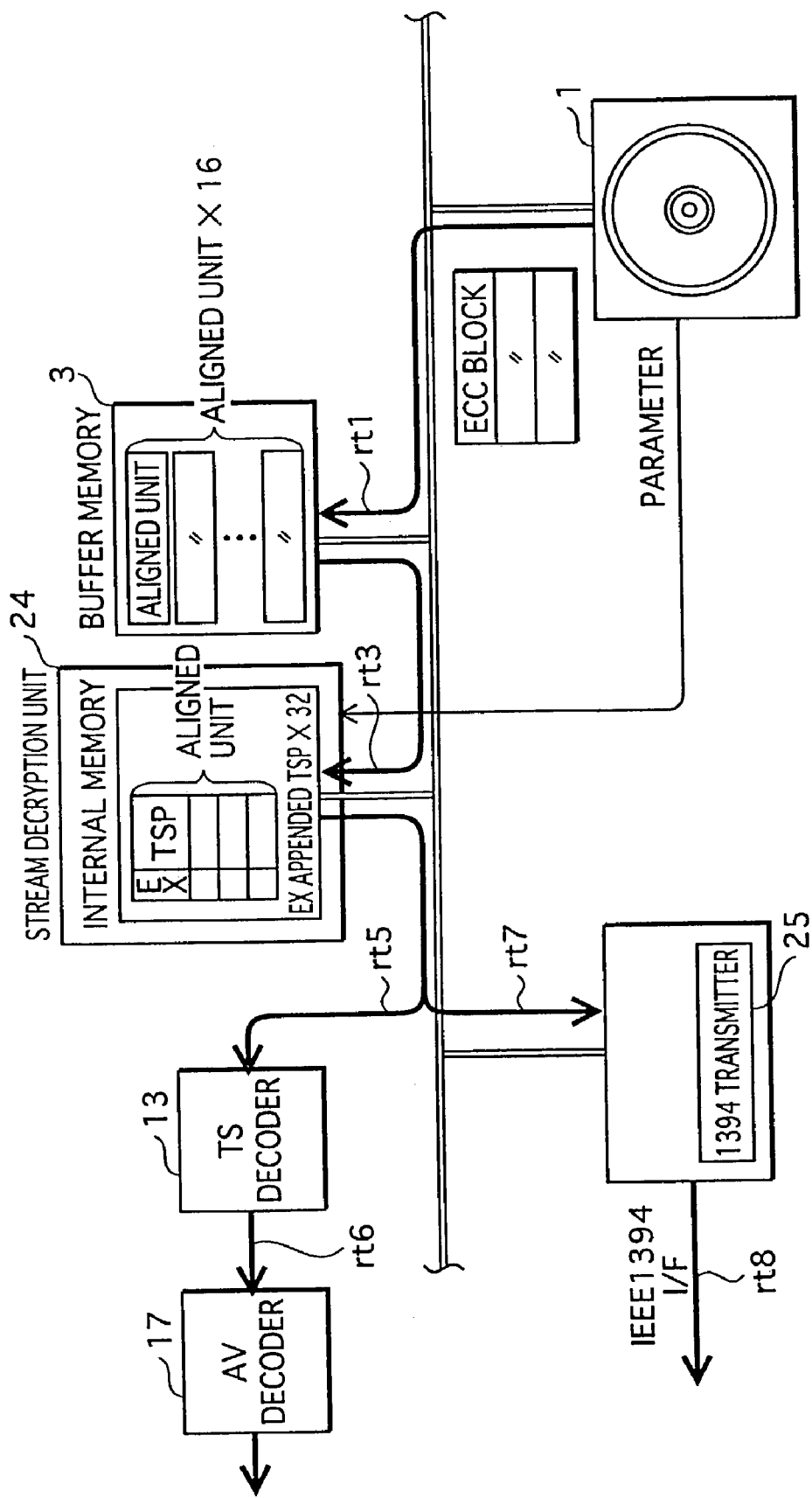
FIG. 26 is a view showing, among the components shown in FIG. 24, components used in data reading.

Next, description is given to the components used to read TS packets from a Blu-ray disc. FIG. 26 is a view showing, among the components of the recording apparatus, components used in data reading (namely, the stream decryption unit 24, the IEEE 1394 transmitter 25). Now, description is given to the stream decryption unit 24 and the IEEE1394 transmitter 25.

The stream decryption unit 24 one by one decrypts Aligned Units contained in an ECC block read into the buffer memory 3. The decryption is performed using a block key Kblk unique to each Aligned Unit in the DES_DCBC mode. The block key Kblk is generated in the following manner. The TP_extra_header contained at the top of each Aligned Unit is not encrypted, so that the stream decryption unit 24 concatenates the copy_permission_indicator, the Arrival_Time_Stamp each in the TP_extra_header, and the parameter Vbkg to obtain 64-bit concatenated data. The stream decryption unit 24 then decrypts the concatenated data using the recording key Krec in the TDES_D mode, thereby obtaining Dblk of the Aligned Unit. Arrows rt5 and rt6 in FIG. 26 show the transmission route of Aliened Unit at the time of playback. As represented by the arrows rt5 and rt6, the Aligned Unit is first decoded by the TS decoder 13, and then decoded by the AV decoder 17 into video and audio signals. When the Dblk is outputted to the IEEE1394 transmitter 25 as represented by the arrows rt7 and rt8, the Aligned Unit is transmitted to another appliance on the home network.

The IEEE1394 transmitter 25 extracts a TP_extra_header from each of 32 EX-appended TS packets contained in the Aligned Unit, encrypts each TS packet in compliance with the DTCP standard and then outputs the encrypted TS packets. Upon output, an isochronous packet is inserted between TS packets as appropriate. A location where an isochronous packet is inserted is determined based on the time shown by the Arrival_Time_Stamp contained in the TP_extra_header. Along with the TS packets, the IEEE1394 transmitter 25 outputs a DTCP_Descriptor. The DTCP_Descriptor shows the copy control setting as indicated in the TP_extra_header.

Figure 27:
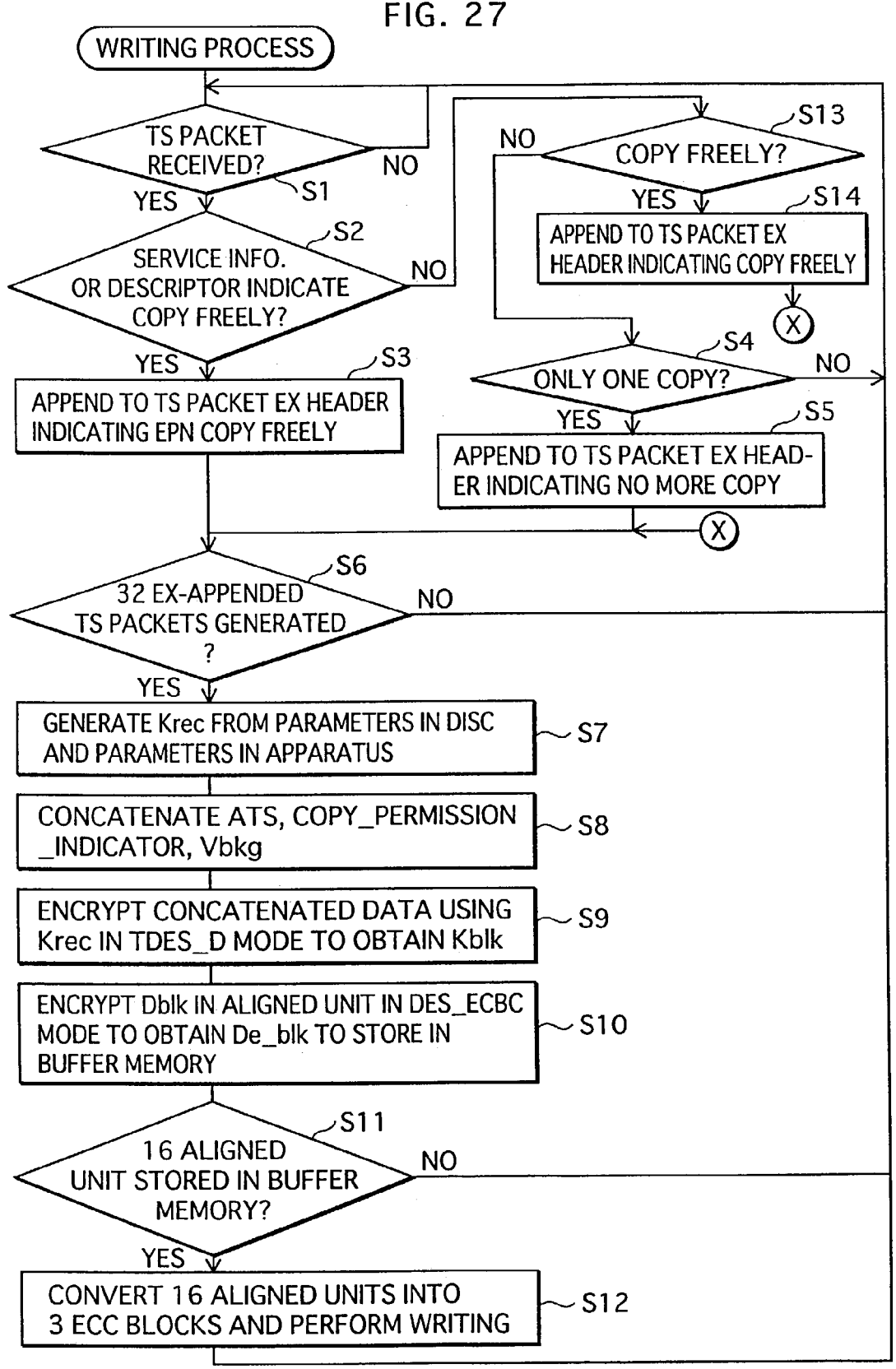
FIG. 27 is a flowchart showing the overall control performed upon writing process according the third embodiment.

Overall control of the recording apparatus having the above construction is performed by the CPU 2 executing the program shown in FIG. 27. Hereinafter, description is given to the process performed by the CPU 2 to write Aligned Units.

Steps S1-S6 shown in FIG. 27 is a loop performed to store EX-appended TS packets to the buffer memory 3. The CPU 2 performs the step S1 in the loop to monitor TS packet input via broadcast waves and the IEEE1394. In response to TS packet input, the CPU 2 performs one of steps S3, S5, and S14 to append a TP_extra_header to a TS packet. Which of the three steps is performed is determined through three judgment steps S2, S4, and S13.

The step S3 is performed to append a TP_extra_header when the copy attribute shown in the service information or the DTCP_Descriptor is EPN-Asserted Copy Freely (step S2, YES). In this case, since the copy attribute is EPN-Asserted Copy Freely, the TP_extra_header appended herein contains a copy_permission_indicator indicating EPN-Asserted Copy Freely (step S3).

The step S5 is performed to append a TP_extra_header when the copy attribute shown in the service information or the DTCP_Descriptor is Only One Copy (step S4, YES). In this case, this Only One Copy attribute needs to be altered to the No More Copy attribute, so that the TP_extra_header appended herein contains a copy_permission_indicator indicating No More Copy (step S5).

The step S14 is performed to append a TP_extra_header when the copy attribute shown in the service information or the DTCP_Descriptor is Copy Freely without any condition (step S13, YES). In this case, since the copy attribute is Copy Freely, the TP_extra_header appended herein contains a copy_permission_indicator indicating Copy Freely (step S14) When the copy attribute is a No More Copy attribute, the processing goes back to the step S1 to wait for TS packet input. With this arrangement, it is ensured that a TS packet having a No More Copy attribute is not written onto a Blu-ray disc.

The step S6 is performed to judge whether 32 EX-appended TS packets are generated. When there are 32 EX-appended TS packets generated, the CPU 2 performs steps S7-S12, and then returns to the step S1. To be more specific, when there are 32 EX-appended TS packets generated, the CPU 2 generates a recording key Krec from a plurality of parameters stored in the Blu-ray disc, and parameters stored in the recording apparatus (step S7), concatenates the Arrival_Time_Stamp, copy_permission_indicator, and parameter Vbkg (step S8), and encrypts the concatenated data using the recording key Krec in the TDES_E mode, thereby obtaining a block key Kblk (step S9).

Once the block key Kblk is obtained, the CPU 2 encrypts the block Dblk of the Aligned Unit except the TP-extra_header located at the top of the block using the bock key Kblk in the DES_ECBC mode, so that an encrypted block De_blk is obtained. The CPU 2 then stores the thus obtained block De_blk into the buffer memory 3 (step S10). Thereafter, the CPU repeatedly performs the steps S1-S10 until there are 16 Aligned Units stored in the buffer memory 3 (step S11, NO). When there are 16 Aligned Units stored in the buffer memory 3 (step S11, YES), the CPU 2 appends error correcting codes to the 16 Aligned Units so that three ECC blocks are obtained. The CPU 2 then writes the three ECC blocks onto the Blu-Ray disc (step S12). By repeating the steps S7-S12, the Aligned Units are sequentially written onto the Blu-ray Disc.

Figure 28:
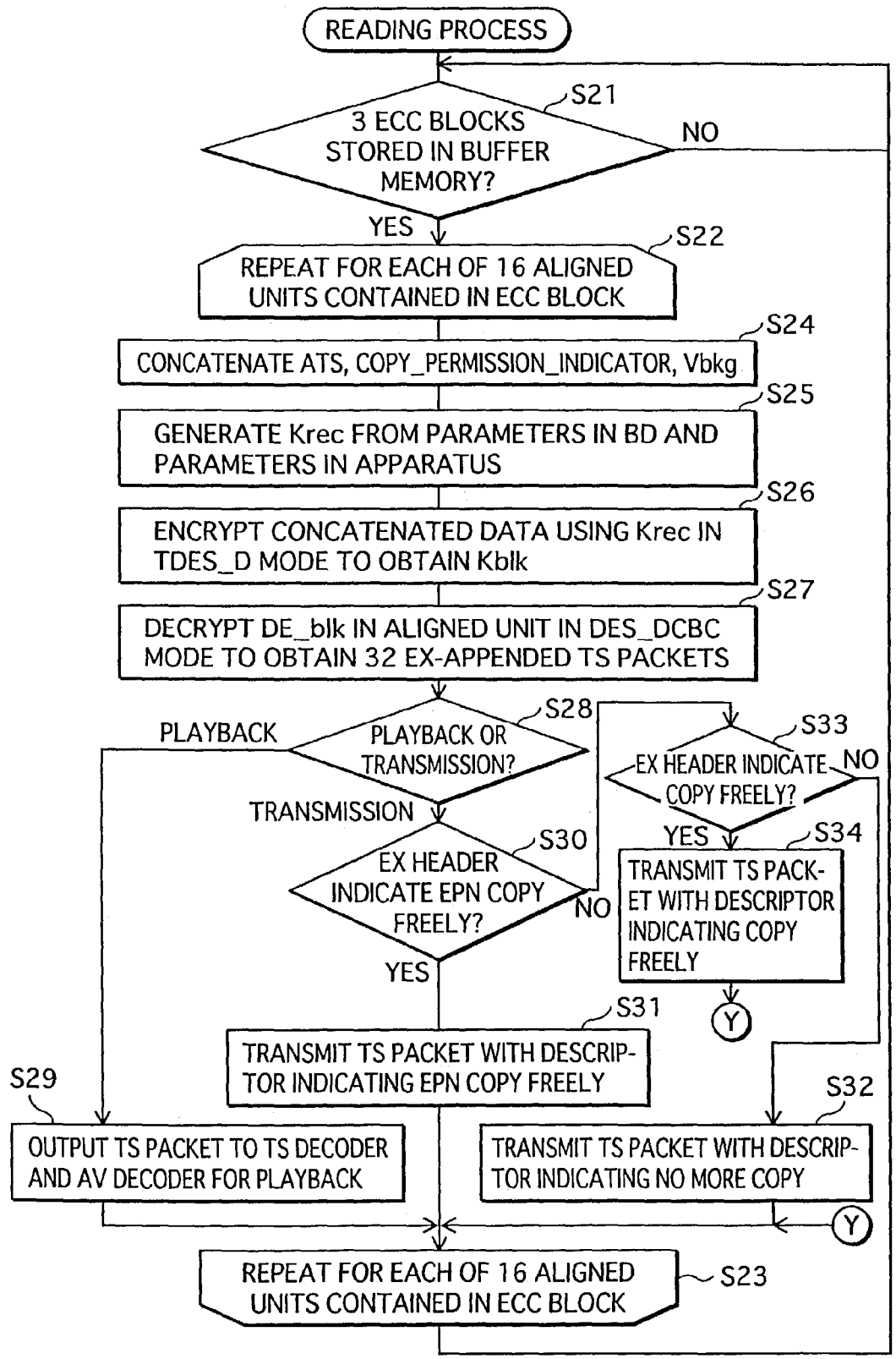
FIG. 28 a flowchart showing the overall control performed upon reading process according the third embodiment.

Next, with reference to FIG. 28, description is given to the processing performed by the CPU 2 to read Aligned Units.

The flowchart in FIG. 28 shows the process to wait until three ECC blocks to be stored in the buffer memory 3, to perform, when they are stored, steps S21-S32, and then to go back to the step S21.

In the loop processing of the steps S22-S23, the CPU 2 repeatedly performs the steps S24-S32 for each of the 16 Aligned Units contained in the three ECC blocks.

The steps repeatedly performed herein are steps of concatenating the copy_permission_indicator contained in an Aligned Unit, Arrival_Time_Stamp also contained in an Aligned Unit, and Vbkg (step S24), generating a recording key Krec from a plurality of parameters stored in the Blu-ray disc and parameters stored in the recording medium (step S25), encrypting the concatenated data using the recording key Krec in the TDES_E mode to obtain a block key Kblk (step S26), and decrypting the block De_blk of the Aligned Unit using the block key Kblk in the DES_DCBC mode to obtain 32 EX-appended TS packets (step S27).

The processing performed thereafter differs depending on whether to perform transmission or playback. For playback (step S28, PLAYBACK), the CPU 2 extracts TS packets from the 32 EX-appended TS packets, and outputs the TS packets to the TS-decoder 13 and the AV decoder 17 where the TS packets are played back (step S29).

For transmission (step S28, TRANSMISSION), the CPU 2 performs a different processing depending on whether the copy_permission_indicator contained in the TP_extra_header indicates EPN-Asserted Copy Freely, No More Copy, or Copy Freely.

When EPN-Asserted Copy Freely is indicated (step S30, YES), the CPU 2 extracts TS packets from the 32 EX-appended TS packets, and transmits the extracted TS packets with a DTCP_Descriptor indicating EPN-Asserted Copy Freely (step S31). When Copy Freely is indicated (step S33, YES), the CPU 2 extracts TS packets from the 32 EX-appended TS packets, and transmits the extracted TS packets with a DTCP_Descriptor indicating Copy Freely (step S34).

When No More Copy is indicated (step S33, NO), the CPU 2 extracts TS packets from the 32 EX-appended TS packets, and transmits the extracted TS packets with a DTCP_Descriptor indicating No More Copy (step S32). By repeating the above steps, the CPU 2 sequentially reads the Aligned Units.

As has been described above, in the present embodiment, an encryption key used to encrypt each Aligned Unit is generated from values that differ for each Aligned Unit as well as for copy control setting. With this arrangement, the copyright protection similar to the first embodiment is achieved, while allowing a user to freely copy a digital stream within a home network.

Fourth Embodiment

In the first embodiment, VOBUs are copied from one apparatus to another apparatus both belong to a same home network. In a fourth embodiment described hereinafter, VOBUs are copied within one apparatus.

Figure 29:
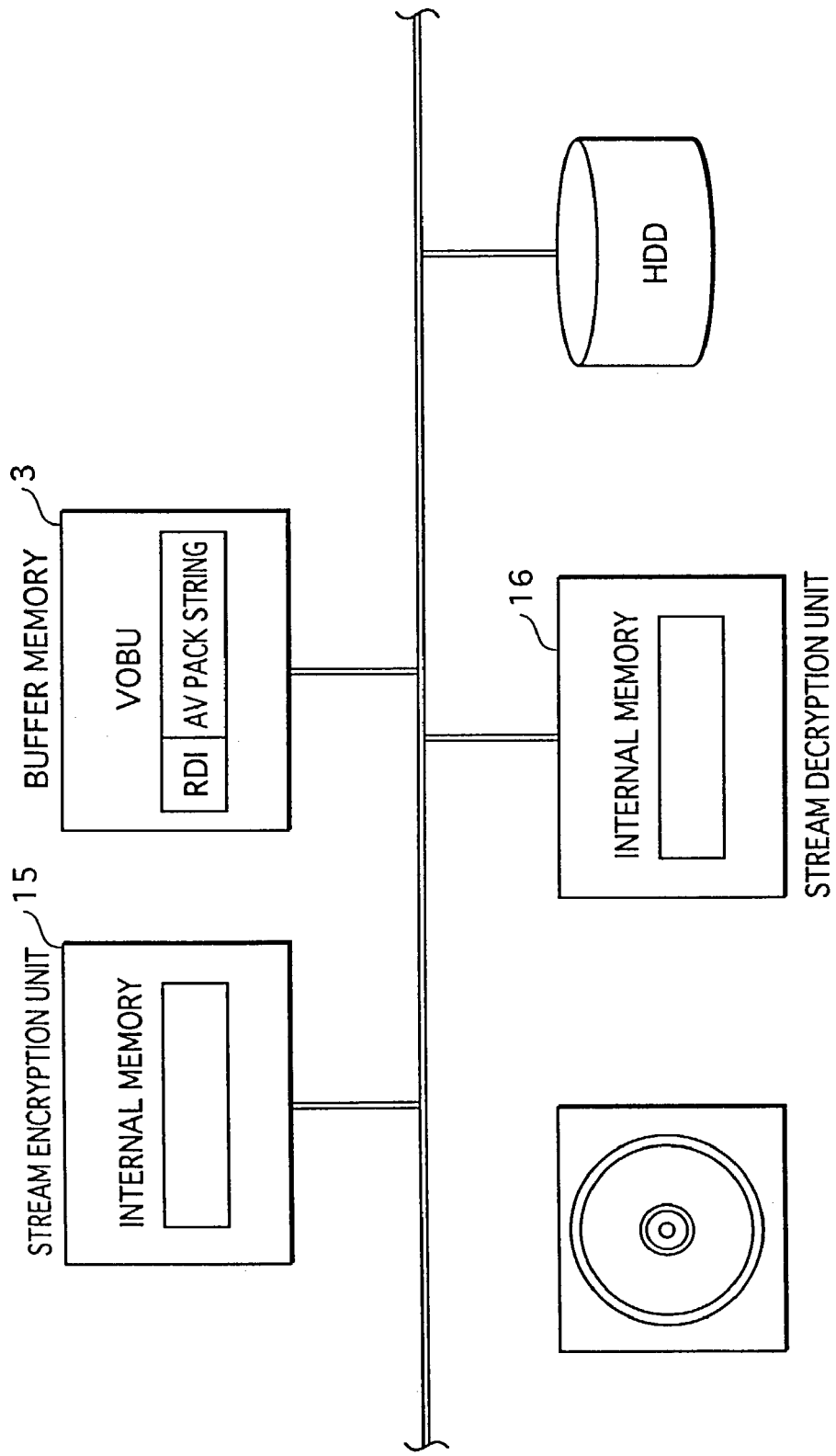
FIG. 29 is a view showing the internal construction of a recording apparatus according to the fourth embodiment.

FIG. 29 is a view showing the internal construction of a recording apparatus according to the fourth embodiment. In the figure, one of the drive 1 and HDD acts as a copy source and the other acts as a copy destination.

The stream decryption unit 16 generates, at the time of copying a VOBU, a content key Kc and a code Dveri from the data stored in the copy source recording medium, and compares the thus generated code Dveri with a code Dveri contained in the RDI-Pack. If they match, the stream decryption unit 16 decrypts, using the content key Kc, the encrypted VOBU that is read from the copy source recording medium.

The stream encryption unit 15 generates a content key Kc that is unique to the copy destination medium, and encrypts the VOBU, which is stored in the buffer memory 3, using the thus generated content key Kc that is unique to the copy destination medium.

Figure 30:
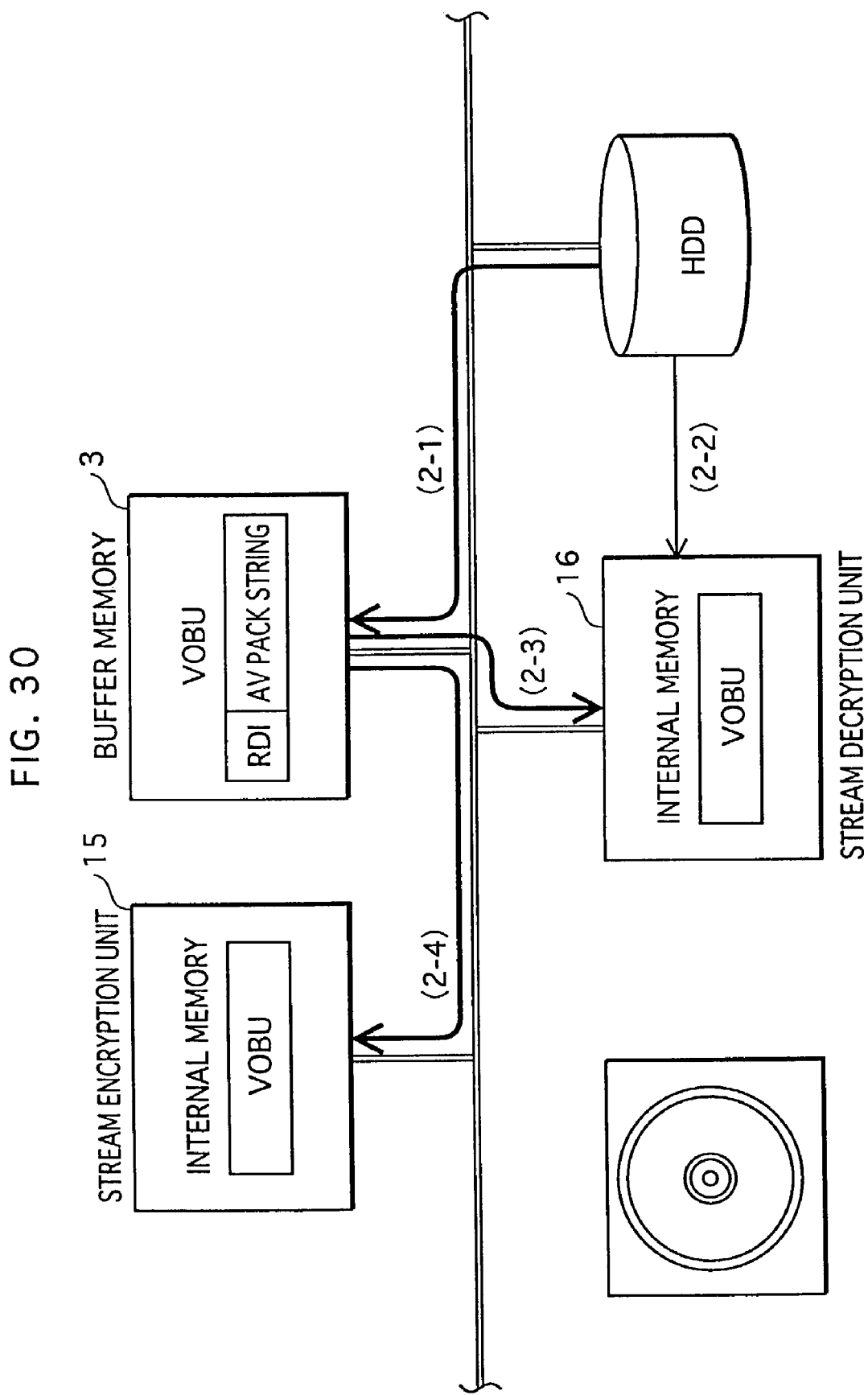
FIG. 30 is a view showing the process through which the Aligned Unit is read from a copy source drive.

FIG. 30 is a view showing the process through which the VOBU is read from the copy source drive.

In the figure, an arrow (2-1) represents an operation for reading a VOBU from the copy source drive, and an arrow (2-2) represents an operation performed by the copy source drive for reading a title key Kt. An arrow (2-3) represents an operation for decrypting the VOBU using the title key Kt. An arrow (2-4) represents an operation for outputting the decrypted VOBU to the stream encryption unit 15.

Figure 31:
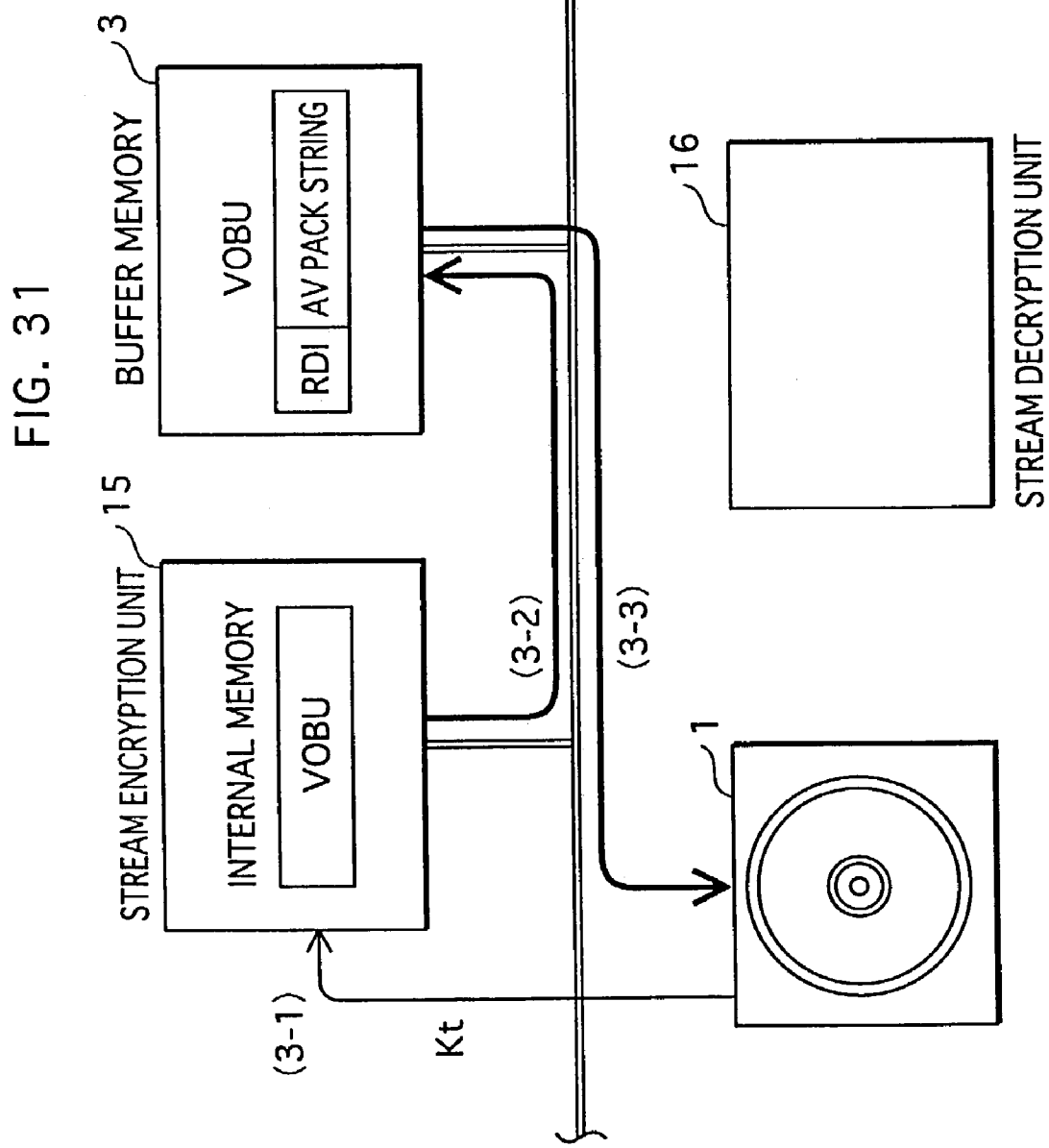
FIG. 31 is a view showing the process through which the Aligned Unit is written onto a copy destination drive.

FIG. 31 is a view showing the process through which the VOBU is written onto the copy destination drive. In the figure, an arrow (3-1) represents an operation performed by the stream encryption unit 15 for reading a title key Kt from the copy destination recording medium. The stream encryption unit 15 generates a content key Kc from the title key Kt, and encrypts the VOBU using the content key Kc. An arrow (3-2) represents an operation for writing the encrypted VOBU to the buffer memory 3, and an arrow (3-3) represents an operation for writing the encrypted VOBU onto the copy destination drive.

As described above, according to the present embodiment, a hybrid recording apparatus that is provided with both an HD drive and a DVD drive performs copying of VOBU within the apparatus in the manner described in the first embodiment.

According to the fourth embodiment above, what is copied within a single apparatus is a VOBU. Alternatively, however, Aligned Units may be copied within a single apparatus.

Supplementary Note

Up to this point, the present invention has been described by way of the embodiments. However, the embodiments are given merely as a system example with which the present invention is expected to achieve the best effect in current circumstances. It is naturally appreciated that various modifications may be made to the present invention without departing from the gist of the present invention. Examples of modifications include the following (A) through (H).

(A) The recording apparatus described in each of the first to fourth embodiments is for use with a digital TV over a home network. However, a recording apparatus may be one that is integrally provided with a liquid crystal display. Further, the recording apparatus in the first embodiment is provided with the drive 1 and the AV decoder 17 both originally built into the recording apparatus. Yet, the recording apparatus may be provided without the two components, which in that case may be connected thereto via IEEE1394 connectors. Further, the recording apparatus in each embodiment may be constructed so that it contains only components that perform essential processing. Being disclosed herein, all of these recording apparatuses are within the scope of the present invention. Regardless of how it is implemented, manufacturing of any recording apparatus using the internal constructions disclosed in the first to fourth embodiments is taken as an act of practicing the present invention. Onerous or gratuitous transfer (selling in the case of onerous transfer, and giving in the case of gratuitous transfer), lending, and importing of the recording apparatuses disclosed in the first to fourth embodiments are all considered to be an act of practicing the present invention. In addition, exhibition at stores or on catalogs or distribution of brochures in order to offer transfer or lending of the recording apparatuses is also deemed to be an act of practicing the present invention.

(B) The information processing shown by way of the flowcharts in FIGS. 16, 17, 27, and 28 are implemented with the use of a hardware resource. That is to say, a computer program implementing the above processing is one form of the present invention. In the first to fourth embodiments, each program is embodied as being incorporated in a respective recording apparatus. Yet, it is applicable to implement each program disclosed in the first to fourth embodiments without the recording apparatus. Acts of practicing such a program include (1) manufacture of the program, (2) onerous or gratuitous transfer of the program, (3) lending of the program, (4) import of the program, (5) distribution of the program via a bidirectional electronic communication network, and (6) offering transfer or lending of the program through exhibition at stores or on catalogs, or distributing of brochures.

(C) The time elements of the steps which are executed in a time series in each of the flowcharts shown in FIGS. 16, 17, 27, and 28 are regarded as the necessary elements to define the present invention. With this being so, the processing shown in each of the above flowcharts is taken as one embodiment of a recording method. When the processing shown in each of the above flowcharts is carried out by performing the above steps in proper time sequence to achieve the object of the present invention with intended effects, it is deemed to be an act of practicing the present invention.

(D) In the first embodiment, the encryption and decryption is performed one by one for each VOBU. Yet, this is merely one example of the recording apparatus embodied so as to be compliant with the DVD-Video Recording standard. The encryption and decryption may be performed for every predetermined number of VOBUs, or for any other data unit compliant with other recording standard.

(E) In the first and second embodiments, the content key Kc and the block key Kblk are generated using the title key Kt and the recording key Krec that are unique to the recording medium used. Yet, the content key Kc and the block key Kblk may be generated using an encryption key that is unique to the digital stream. With this arrangement, the encryption and decryption can be performed independently of any recording medium. Consequently, it is not necessary to perform decryption and encryption at the time of reading data from and writing data to the recording medium. Thus, copying can be performed at high speed.

(F) In the second embodiment, the content key Kc is obtained using a time varying coefficient Dtkc present in the same VOBU that is to be encrypted/decrypted. Yet, the content key Kc may be generated using a time varying coefficient present in a VOBU that is located immediately before or after the current VOBU. With this arrangement, it is no longer possible to obtain the content key Kc if the adjacent VOBU is deleted. That is to say, by generating the content key Kc using a time varying coefficient Dtkc that is contained in an adjacent VOBU, the integrity of the entire VOBU is maintained.

(G) The AV encoder 14 may encode analog video and audio signals that are outputted from a VCR rather than from the analog tuner 9.

(H) In the first embodiment, the content key Kc is calculated using APSTB without other part of CCI, and the title key Kt. Yet, the compatibility with an existing model is maintained also by generating the content key Kc from the CGMS and the title key Kt. Further, although it is described that the CCI is contained in the RDI-Pack or the TP_extra_header, the CCI may be embedded into the digital stream through the use of watermarking technology.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording medium on which a digital stream is recorded, wherein
the digital stream is associated on a segment-by-segment basis with copy control information indicating whether a segment has a Conditional Copy Freely status, the Conditional Copy Freely status indicating the segment is permitted to be freely copied on a condition that the segment is recorded in a copy destination in an encrypted form, and
each segment recorded on the recording medium is in an encrypted form, the encryption being performed using a predetermined encryption key,
each segment recorded on the recording medium is associated with a check code, the check code being obtained by converting the copy control information using the encryption key, and the check code has a different value depending on whether the copy control information indicates the Conditional Copy Freely status, and
each check code and a corresponding copy control information are contained in each corresponding segment and recorded on the recording medium together with the digital stream, the check code being used to determine whether unauthorized tampering with the copy control information has occurred,
each encryption key for a segment is calculated from three parameters, a first parameter including analog protection information for the segment, a second parameter including a time varying coefficient obtained from the segment, and a third parameter including data unique to the recording medium,
the analog protection information indicates whether a copy control is applied to analog signals converted from the segment,
the time varying coefficient takes on a different value depending on where the segment is located in a playback time axis of the digital stream,
each segment is located on the recording medium with a predetermined offset from a location of a corresponding time varying coefficient, and
the predetermined offset is determined based on a sum of time taken to calculate the encryption key from the three parameters and to obtain the check code by converting the copy control information using the encryption key.

2. A recording apparatus comprising:
a judging unit operable to judge a copy attribute of signals inputted from an external source, the signals representing a segment of a digital stream;
a writing unit operable to write, when the copy attribute indicates that the segment is conditionally permitted to be freely copied, the segment onto a recording medium in association with copy control information indicating a Conditional Copy Freely status, the Condition Copy Freely status indicating that the segment is permitted to be freely copied on a condition that the segment is recorded in a copy destination in encrypted form; and
an encrypting unit operable to encrypt the segment using a predetermined encryption key, wherein
said writing unit writes the encrypted segment on the recording medium in association with a check code,
the check code is obtained by converting the copy control information using the encryption key, and the check code has a different value depending on whether the copy control information indicates the Conditional Copy Freely status, and
each check code and a corresponding copy control information are contained in each corresponding segment and recorded on the recording medium together with the digital stream, the check code being used to determine whether unauthorized tampering with the code control information has occurred,
each encryption key for a segment is calculated from three parameters, a first parameter being analog protection information for the segment, a second parameter being a time varying coefficient obtained from the segment, and a third parameter being data unique to the recording medium,
the analog protection information indicates whether a copy control is applied to analog signals converted from the segment,
the time varying coefficient takes on a different value depending on where the segment is located in a playback time axis of the digital stream,
each segment is located on the recording medium with a predetermined offset from a location of a corresponding time varying coefficient, and
the offset is determined based on a sum of time taken to calculate the encryption key from the three parameters and to obtain the check code by converting the copy control information using the encryption key.

3. The recording apparatus according to claim 2, wherein the encryption key takes on a different value depending on whether the copy control information indicates the Conditional Copy Freely status.

4. The recording apparatus according to claim 2, wherein the copy control information contains generational management information and an extension flag, and the copy control information indicates the Conditional Copy Freely status when (1) the generational management information is set to a value representing that the segment is prohibited from being copied, and (2) the extension flag is set to ON.

5. A duplicating apparatus for copying a digital stream recorded on a source recording medium to a destination recording medium, comprising:

a reading unit operable to read from the source recording medium a segment of the digital stream and copy control information associated with the segment, the digital stream being in encrypted form;

a decrypting unit operable to (1) generate a check code, (2) compare the generated check code with a check code that is pre-recorded in the source recording medium, and (3) when the two check codes match, decrypt using an encryption key the segment read by said reading unit, the encryption key being unique to the source recording medium;

an encrypting unit operable to encrypt the decrypted segment using an encryption key unique to the destination recording medium; and a writing unit operable to write, when the copy control information indicates a Conditional Copy Freely status, the encrypted segment onto the destination recording medium in association with the copy control information, wherein the generation of the check code is performed by encrypting the copy control information using the encryption key, and the check code has different value depending on whether the copy control information indicates the Conditional Copy Freely status, and each check code and a corresponding copy control information are contained in each corresponding segment and recorded on the destination recording medium together with the digital stream, the check code being used to determine whether unauthorized tampering with the copy control information has occurred each encryption key for a segment is calculated from three parameters, a first parameter including analog protection information for the segment, a second parameter including a time varying coefficient obtained from the segment, and a third parameter including data unique to the recording medium, the analog protection information indicates whether a copy control is applied to analog signals converted from the segment, the time varying coefficient takes on a different value depending on where the segment is located in a playback time axis of the digital stream, each segment is located on the recording medium with a predetermined offset from a location of a corresponding time varying coefficient, and the predetermined offset is determined based on a sum of time taken to calculate the encryption key from the three parameters and to obtain the check code by converting the copy control information using the encryption key.

* * * * *